US011042999B2

(12) United States Patent
Ko et al.

(10) Patent No.: US 11,042,999 B2
(45) Date of Patent: Jun. 22, 2021

(54) ADVANCED DRIVER ASSIST SYSTEMS AND METHODS OF DETECTING OBJECTS IN THE SAME

(71) Applicant: Samsung Electronics Co., Ltd., Suwon-si (KR)

(72) Inventors: Sangsoo Ko, Suwon-si (KR); Byeoungsu Kim, Suwon-si (KR); Jaegon Kim, Suwon-si (KR); Sanghyuck Ha, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 63 days.

(21) Appl. No.: 16/660,284

(22) Filed: Oct. 22, 2019

(65) Prior Publication Data

US 2020/0364892 A1   Nov. 19, 2020

(30) Foreign Application Priority Data

May 17, 2019   (KR) .......................... 10-2019-0058048

(51) Int. Cl.
*G06K 9/00* (2006.01)
*G06T 7/593* (2017.01)
(Continued)

(52) U.S. Cl.
CPC ................ *G06T 7/593* (2017.01); *B60R 1/00* (2013.01); *G05D 1/0253* (2013.01); *G05D 1/12* (2013.01);
(Continued)

(58) Field of Classification Search
CPC ..................... G06T 7/593; G06T 7/248; G06T 2207/10021; G06T 2207/30252;
(Continued)

(56) References Cited

U.S. PATENT DOCUMENTS 8,976,999 B2 * 3/2015 Saito ........................ G06K 9/70
                                                    382/103
10,041,791 B2 * 8/2018 Ishigami ............ G06K 9/00805
(Continued)

FOREIGN PATENT DOCUMENTS

EP        1168248 A2 *  1/2002 ............. G06T 11/00
EP        2889641 A1     7/2015
(Continued)

*Primary Examiner* — Mahendra R Patel
(74) *Attorney, Agent, or Firm* — Harness, Dickey & Pierce, P.L.C.

(57) ABSTRACT

An advanced driver assist system (ADAS) may obtain a video sequence including a plurality of frames captured at the vehicle, each frame corresponding to a separate stereo image including a first viewpoint image and a second viewpoint image; generate disparity information associated with a stereo image; obtain depth information associated with an object included in the stereo image based on reflected electromagnetic waves captured at the vehicle; calculate correlation information between the depth information and the disparity information based on the stereo image, the depth information and the disparity information; and correct depth values associated with the stereo image based on the disparity information and the correlation information to generate a depth image with respect to the stereo image. The ADAS may detecting the at least one object in the stereo image, based on the depth image, and may generate an output signal based on the detection.

18 Claims, 22 Drawing Sheets

(51) Int. Cl.
*H04N 13/128* (2018.01)
*G06T 7/246* (2017.01)
*G06K 9/62* (2006.01)
*B60R 1/00* (2006.01)
*G05D 1/12* (2006.01)
*G05D 1/02* (2020.01)

(52) U.S. Cl.
CPC ......... *G06K 9/00791* (2013.01); *G06K 9/629* (2013.01); *G06T 7/248* (2017.01); *H04N 13/128* (2018.05); B60R 2300/303 (2013.01); G05D 2201/0213 (2013.01); G06T 2207/10021 (2013.01); G06T 2207/20081 (2013.01); G06T 2207/30241 (2013.01); G06T 2207/30252 (2013.01)

(58) Field of Classification Search
CPC .......... G06T 2207/20081; G06T 2207/30241; H04N 13/128; H04N 2013/0085; H04N 13/239; G06K 9/00791; G06K 9/629; G06K 9/00805; B60R 1/00; B60R 2300/303; B60R 1/10; B60R 2300/607; B60R 2300/105; G05D 1/12; G05D 1/0253; G05D 2201/0213
USPC ........................................................ 382/104
See application file for complete search history.

(56) References Cited

U.S. PATENT DOCUMENTS

| | | | |
|---|---|---|---|
| 2011/0095910 A1* | 4/2011 | Takano | B62D 15/0275 340/932.2 |
| 2012/0242806 A1 | 9/2012 | Ibrahim et al. | |
| 2015/0160340 A1* | 6/2015 | Grauer | G01S 17/08 356/5.04 |
| 2015/0210274 A1* | 7/2015 | Clarke | G08G 1/167 382/104 |
| 2016/0375821 A1* | 12/2016 | Schofield | B60K 31/00 701/36 |
| 2017/0032196 A1* | 2/2017 | Gupta | G06K 9/00798 |
| 2017/0083772 A1* | 3/2017 | Kim | G06K 9/00791 |
| 2017/0120822 A1* | 5/2017 | Petzold | B60Q 1/00 |
| 2017/0158197 A1* | 6/2017 | Johnson | B60W 10/20 |
| 2017/0161576 A1* | 6/2017 | Banno | G08B 21/02 |
| 2017/0243532 A1* | 8/2017 | Huang | H02M 3/07 |
| 2017/0293198 A1* | 10/2017 | Kim | B60R 1/00 |
| 2017/0324943 A1* | 11/2017 | Wu | H04N 5/23238 |
| 2018/0120108 A1* | 5/2018 | Takahashi | G06K 9/036 |
| 2018/0227483 A1* | 8/2018 | Ben-Dayan Rubin | H04N 5/247 |
| 2018/0285661 A1* | 10/2018 | Amano | G08G 1/16 |
| 2019/0187256 A1* | 6/2019 | Wang | G01S 17/931 |
| 2020/0003886 A1* | 1/2020 | Cho | G01S 7/417 |
| 2020/0086858 A1* | 3/2020 | Yao | B60W 30/0956 |

FOREIGN PATENT DOCUMENTS

| | | | | |
|---|---|---|---|---|
| FR | 2979311 A1 | * | 3/2013 | ............ B60Q 9/007 |
| JP | 2006312439 A | * | 11/2006 | |
| JP | 2018092604 A | | 6/2018 | |
| KR | 20150051388 A | | 5/2015 | |

\* cited by examiner

DPIMG

MKS

DT IMG1

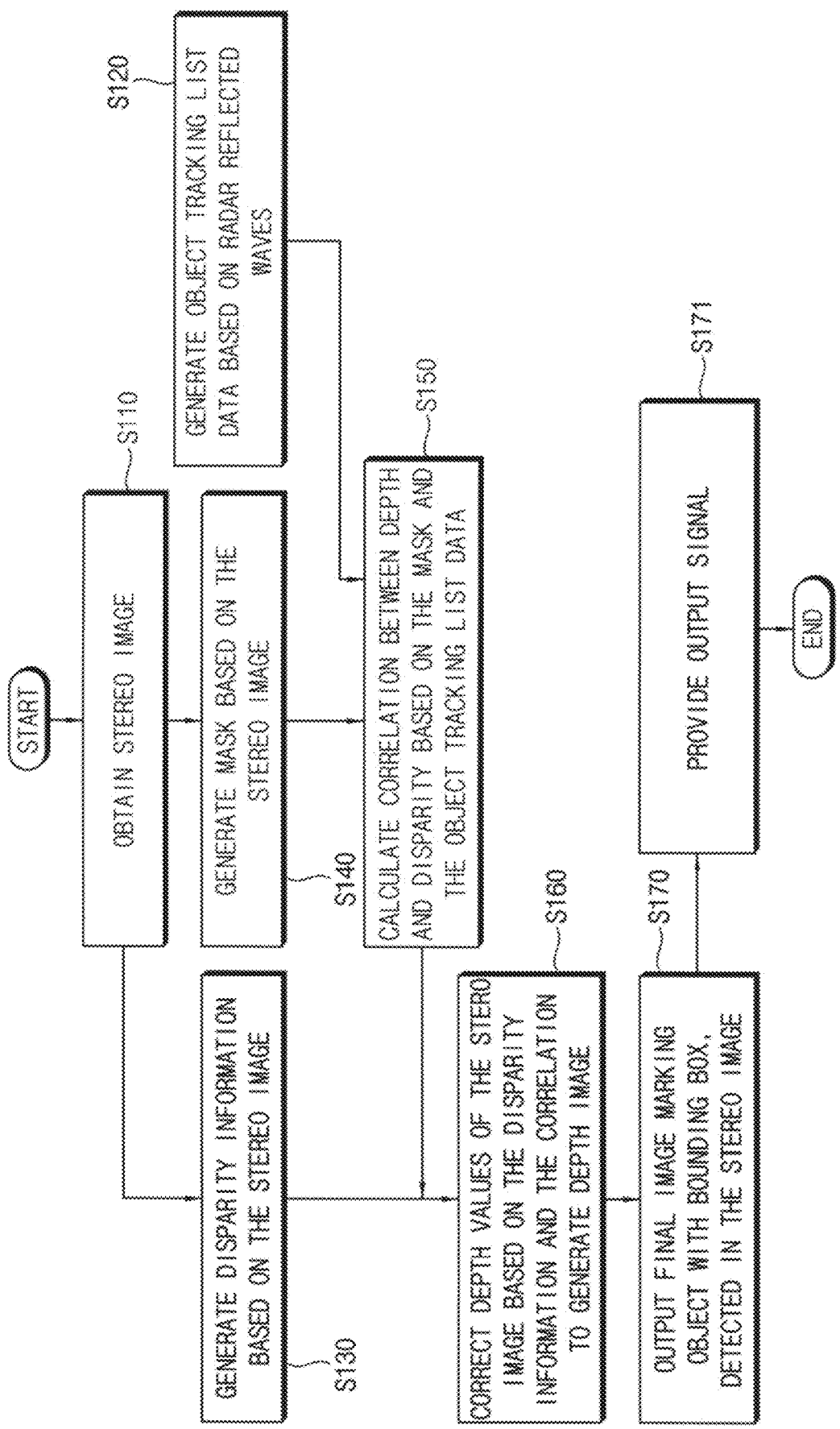

ADVANCED DRIVER ASSIST SYSTEMS AND METHODS OF DETECTING OBJECTS IN THE SAME

CROSS-REFERENCE TO RELATED APPLICATION

This US application claims priority under 35 USC § 119 to Korean Patent Application No. 10-2019-0058048, filed on May 17, 2019, in the Korean Intellectual Property Office (KIPO), the disclosure of which is incorporated in its entirety by reference herein.

BACKGROUND

1. Technical Field

Example embodiments relate generally to object detection, and more particularly to advanced driver assist systems (ADAS) capable of detecting objects from a driving vehicle and methods of detecting objects via the ADAS.

2. Discussion of the Related Art

An ADAS is a system that assists or supports a driver in driving a vehicle. The ADAS may include a system that at least partially controls driving of the vehicle to keep within one or more lanes of a road, a system that provides a warning to the driver of one or more objects located in a blind spot of the driver, and a system that implements automatic emergency braking of the vehicle. Object detection and scene segmentation using images are techniques used to support ADAS.

As techniques applied to vehicles have evolved, various schemes to recognize whether an event associated with driving vehicles is occurring have been developed.

SUMMARY

Some example embodiments are directed to provide advanced driver assist systems (ADAS) configured to detect objects, capable of enhancing quality of depth images. The enhanced quality depth images may be used to detect objects in a driving environment through which a vehicle is moving, and notification messages may be generated and/or driving of a vehicle may be controlled based on the detection, including based on determining occurrence of one or more events associated with driving the vehicle.

Some example embodiments are directed to providing methods of detecting objects in the ADAS, capable of enhancing quality of depth images. The methods may include detecting objects in a driving environment through which a vehicle is moving, and generating output signals that include notification messages and/or cause driving of a vehicle to be controlled based on the detection, including based on determining occurrence of one or more events associated with driving the vehicle.

According to some example embodiments, an advanced driver assist system (ADAS) may include a processing circuit, and a memory which stores instructions executable by the processing circuit. The processing circuit may be configured to execute the instructions to cause the ADAS to: obtain, from a vehicle, a video sequence including a plurality of frames captured at the vehicle, each frame of the plurality of frames corresponding to a separate stereo image including a first viewpoint image and a second viewpoint image; generate disparity information associated with a stereo image of a frame of the plurality of frames based on the first viewpoint image and the second viewpoint image; obtain depth information associated with at least one object included in the stereo image based on reflected electromagnetic waves captured at the vehicle; calculate correlation information between the depth information and the disparity information based on the stereo image, the depth information and the disparity information; correct depth values associated with the stereo image based on the disparity information and the correlation information to generate a depth image of the stereo image; and generate an output signal based on the depth image to cause one or more output interfaces of the vehicle to provide a notification message to an occupant of vehicle, or cause one or more driving control elements of the vehicle to at least partially control driving of the vehicle along a driving trajectory.

According to some example embodiments, an advanced driver assist system (ADAS) may include a processing circuit, and a memory which stores instructions executable by the processing circuit. The processing circuit may be configured to execute the instructions to cause the ADAS to: obtain, from a vehicle, a video sequence including a plurality of frames captured at the vehicle, each frame of the plurality of frames corresponding to a separate stereo image including a first viewpoint image and a second viewpoint image; generate disparity information associated with a stereo image of a frame of the plurality of frames based on the first viewpoint image and the second viewpoint image; obtain depth information associated with at least one object included in the stereo image based on reflected electromagnetic waves captured at the vehicle; obtain point cloud information associated with at least one object included in the stereo image based on reflected light captured at the vehicle; calculate correlation information between the depth information and the disparity information based on the stereo image, the depth information, the point cloud information and the disparity information; correct depth values of the stereo image based on the disparity information and the correlation information to generate a depth image of the stereo image; and generate an output signal based on the depth image to cause one or more output interfaces of the vehicle to provide a notification message to an occupant of vehicle, or cause one or more driving control elements of the vehicle to at least partially control driving of the vehicle along a driving trajectory.

According to some example embodiments, a method of detecting an object in an advanced driver assist system (ADAS) may include: obtaining, from a vehicle, a video sequence including a plurality of frames captured at the vehicle, each frame of the plurality of frames corresponding to a separate stereo image including a first viewpoint image and a second viewpoint image; calculating disparity information associated with a stereo image of a frame of the plurality of frames based on the first viewpoint image and the second viewpoint image; obtaining depth information associated with at least one object included in the stereo image based on reflected electromagnetic waves captured at the vehicle; calculating correlation information between the depth information and the disparity information based on the stereo image, the depth information and the disparity information; correcting depth values associated with the stereo image based on the correlation information to generate a depth image of the stereo image; and generating an output signal based on the depth image to cause one or more output interfaces of the vehicle to provide a notification message to an occupant of vehicle, or cause one or more driving control elements of the vehicle to at least partially control driving of the vehicle along a driving trajectory.

In some example embodiments, an ADAS may calculate disparity information of ("associated with") a stereo image, obtain depth information of an object in the stereo image, calculate correlation between the disparity information and the depth information, and correct depth values of the stereo image based on the correlation to enhance quality of depth image. Therefore, the ADAS may increase efficiency of detecting an object in a driving environment based on processing of the depth image. Such detection may thus reduce computing resources associated with detecting an object, and may increase object detection accuracy, which may increase accuracy and responsiveness of an ADAS's ability to determine occurrence of an event associated with the vehicle, which may improve effectiveness of vehicle driving control and/or notification messages generated based on object detection, which may improve safety of driving in a vehicle that includes the ADAS.

BRIEF DESCRIPTION OF THE DRAWINGS

Illustrative, non-limiting example embodiments will be more clearly understood from the following detailed description in conjunction with the accompanying drawings.

FIG. 16 is a flow chart illustrating a method of detecting an object in the ADAS in FIG. 2 according to some example embodiments.

DETAILED DESCRIPTION

Various example embodiments will be described more fully hereinafter with reference to the accompanying drawings, in which some example embodiments are shown.

Figure 1:
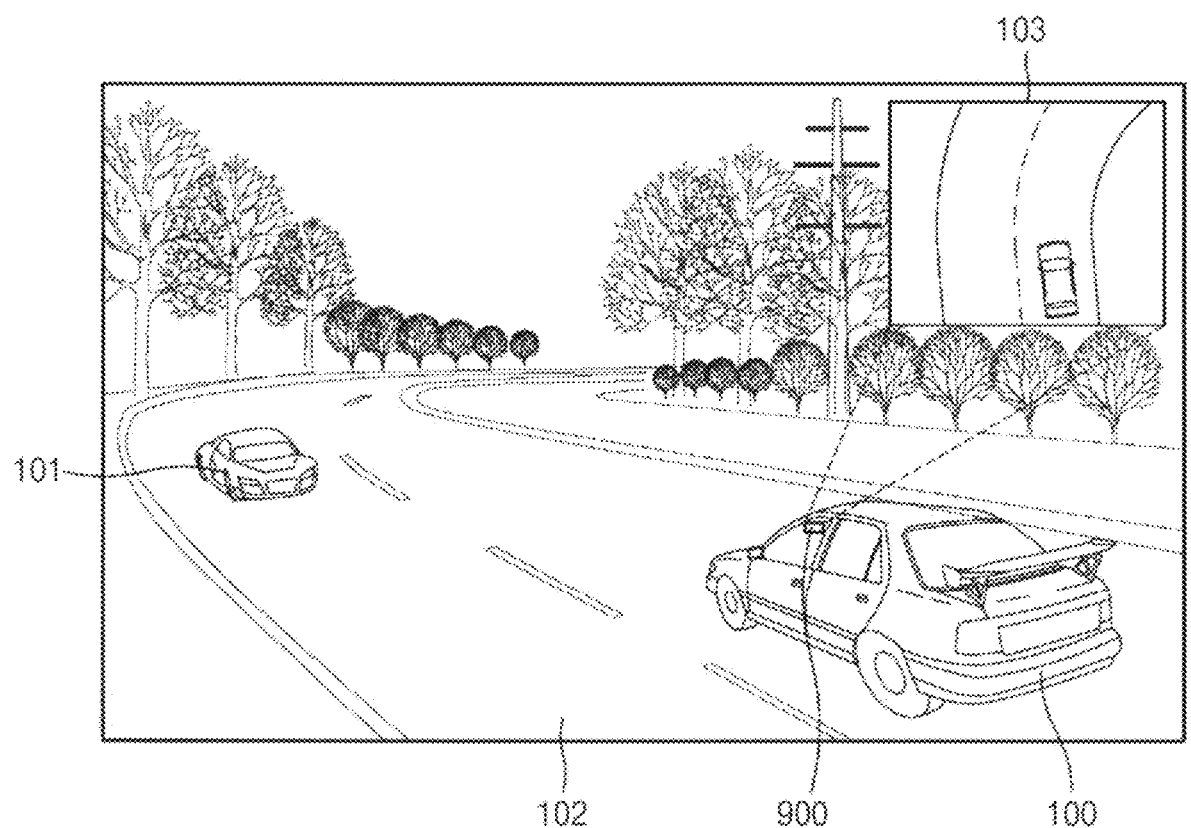
FIG. 1 illustrates an example in which an advanced driver assist system (ADAS) detects an object in front of a vehicle and determines whether an event occurs, according to some example embodiments.

FIG. 1 illustrates an example in which an advanced driver assist system (ADAS) detects an object in front of a vehicle and determines whether an event occurs, according to some example embodiments.

Referring to FIG. 1, an ADAS 900 may be a device included (e.g., mounted) in a vehicle 100. The ADAS 900 may include various instances of circuitry and components configured to receive a video sequence including a stereo image, reflected waves (e.g., reflected electromagnetic waves), or reflected lights from a camera mounted in the vehicle 100 and determine occurrence of various events associated with the vehicle 100. The various events may include object detection, object tracking and scene segmentation. The ADAS 900 may generate an output signal that includes a notification message that may be presented to an occupant (e.g., user) of the vehicle 100, via one or more user interfaces of the vehicle 100, based on a determined occurrence of one or more events. The ADAS 900 may generate an output signal that causes a vehicle control system of the vehicle 100 to control one or more driving elements of the vehicle 100 to control the driving (e.g., driving trajectory) of the vehicle 100, based on a determined occurrence of one or more events.

While it is described that the ADAS 900 receives the video sequence from the camera mounted in the vehicle 100, example embodiments are not limited thereto. The ADAS 900 may receive the video sequence from a camera to capture a surrounding environment of the vehicle 100. The surrounding environment of the vehicle 100 (also referred to herein as a driving environment associated with the vehicle 100) may include, for example, a front side, lateral sides, and a rear side.

According to some example embodiments, the ADAS 900 may detect an event based on location of the event by tracking a bounding box designating the object and thus, may differently recognize levels of importance of a type of object based on locations thereof, thereby determining whether an event occurs based on the locations of the object.

According to some example embodiments, the ADAS 900 may detect at least one video sequence (or, a stereo image) 103 including an object, from among a plurality of video sequences, and may obtain radar reflected waves (e.g., reflected electromagnetic waves) or reflected lights (not shown). Reflected waves may be captured at one or more sensors at the vehicle 100 and may be reflected from one or more objects located in the surrounding environment (e.g., driving environment). The ADAS 900 may detect a road 102 including a fixed pattern and another vehicle 101 moving according to time, by analyzing the at least one video sequence 103. According to some example embodiments, the ADAS 900 may determine occurrence of an event based on detection of the other vehicle 101, by analyzing a location of the other vehicle 101 by analyzing a coordinate of the other vehicle 101 in the at least one video sequence 103. The ADAS may further, based on the determination, generate an output signal that, when processed by a control system of the vehicle 100, causes a particular notification message to be presented to an occupant of the vehicle 100 via a user interface of the vehicle 100 and/or causes driving of the vehicle 100 to be controlled to cause the vehicle 100 to be driven along a particular driving path (e.g., driving trajectory) through the surrounding environment (e.g., autonomous driving, driving the vehicle 100 as an autonomous vehicle, etc.).

The ADAS 900 may include various instances of circuitry, including, for example, and without limitation, head units or embedded boards in vehicles, or the like, but is not limited thereto. Also, the ADAS 900 may include wearable devices having a communication function and a data processing function, such as, for example, watches, glasses, hair bands, rings, or the like. However, the ADAS 900 is not limited thereto, and may include all types of devices configured to obtain an image (for example, a video and a still image) from a camera and provide a notification message to a user based on the obtained image.

The ADAS 900 may be included in, may include, and/or may be implemented by, one or more instances of processing circuitry (e.g., processing circuit 1000*a*) such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. In some example embodiments, the processing circuitry may include a non-transitory computer readable storage device (e.g., memory 1100), for example a solid state drive (SSD), storing a program of instructions, and a processor configured to execute the program of instructions to implement the functionality of the ADAS 900.

According to some example embodiments, the ADAS 900 may be a module mounted in a vehicle 100 including various instances of circuitry and components. The ADAS 900 may be configured to control an operation of the vehicle and communicate with other modules mounted in the vehicle via a certain network.

According to some example embodiments, the vehicle 100 may include any means of transportation, such as, for example, and without limitation, an automobile, a bus, a truck, a train, a bicycle, a motorcycle, or the like, providing a communication function, a data processing function, and/or a transportation function.

Also, the ADAS 900 may communicate with a server (not shown) and another electronic device (not shown) via a certain network, in order to receive a video sequence, reflected waves, or reflected lights, transmit a notification message, and transmit a command for controlling an operation of the other electronic device. In this case, the network may include, for example, and without limitation, a local area network (LAN), a wide area network (WAN), a value-added network (VAN), a mobile radio communication network, a satellite communication network, or the like, and any combinations thereof. The network may be a comprehensive data communication network configured to enable components included in the network to smoothly communicate with one another, and may include the wired Internet, the wireless Internet, and a mobile wireless communication network. The wireless communication may include, for example, and without limitation, wireless LAN (Wi-fi), Bluetooth, Bluetooth low energy, Zigbee, Wi-fi direct (WFD), ultra wideband (UWB), infrared data association (IrDA), near-field communication (NFC), or the like, but is not limited thereto.

Figure 2:
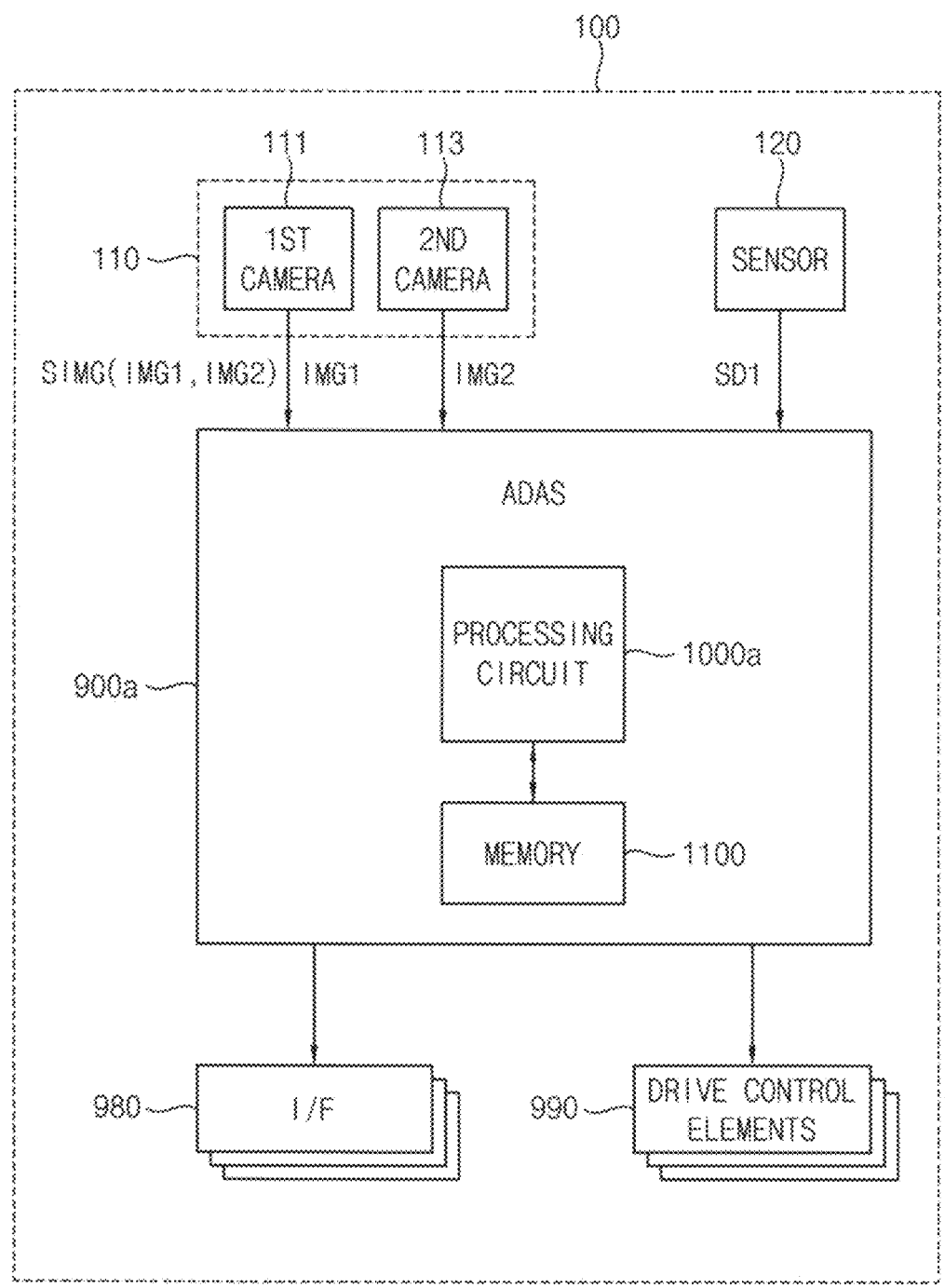
FIG. 2 is a block diagram illustrating an example of an ADAS according to some example embodiments.

FIG. 2 is a block diagram illustrating an example of an ADAS according to some example embodiments.

Referring to FIG. 2, an ADAS 900*a* may include a processing circuit 1000*a* and a memory 1100.

In FIG. 2, a first sensor 110 and a second sensor 120 which are mounted in the vehicle 100 are illustrated together for convenience of explanation. The first sensor 110 may be a stereo camera and may include a first camera 111 and a second camera 112. The second sensor 120 may be a radar to generate distance information or a light detection and arranging (LiDAR) to generate depth information, for example based on reflected electromagnetic (EM) waves captured at the second sensor 120 while the vehicle 100 is being driven. In FIG. 2, it is assumed that the second sensor 120 is a radar. The processing circuit 1000*a* may include at least one processor.

The stereo camera 110 captures a front side of the vehicle 100 and provides the processing circuit 1000*a* with a video sequence including a plurality of frames. Each frame of the plurality of frames may correspond to a separate stereo image SIMG including a first viewpoint image IMG1 and a second viewpoint image IMG2 of the surrounding environment. The radar 120 radiates radio frequency, receives radar reflected waves reflected from the object in the surrounding environment and provides the received radar reflected waves to the processing circuit 1000*a* as a first sensing data SD1.

The memory 1100 stores instructions executable by the processing circuit 1000*a* and the processing circuit 1000*a* executes the instructions to implement functionality of the ADAS 900*a*, which may cause the ADAS 900*a* to obtain, from the vehicle 100, a video sequence including a plurality of frames, where each frame corresponds to a separate stereo image SIMG captured at the vehicle 100 (e.g., while driving the vehicle 100), to calculate (e.g., generate) disparity information of (e.g., associated with) the stereo image based on the first viewpoint image IMG1 and the second viewpoint image IMG2, e.g., by performing stereo matching on the first viewpoint image IMG1 and the second viewpoint image IMG2 in the stereo image including SIMG, to obtain the first sensing data SD1 (e.g., depth information) to generate an object tracking list which is matched with at least one object in the stereo image, to segment the at least one object in the stereo image SIMG to extract at least one mask and to match the at least one mask and the object tracking list.

The processing circuit 1000a executes the instructions to cause the ADAS 900a to obtain depth information associated with at least one object included in the stereo image of the surrounding environment based on reflected waves (e.g., EM waves reflected from the at least one object) captured at the vehicle 100 (e.g., at the second sensor 120), calculate correlation information between the depth information and the disparity information based on a result of the matching and the disparity information (e.g., based on the stereo image, the depth information, and the disparity information) to correct depth values of (e.g., associated with) the stereo image SIMG based on the correlation information and the disparity information to generate a depth image of the stereo image SIMG (e.g., a depth image of the surrounding environment), to detect the object in the depth image, to determine a type of the detected object and to mark the detected object with a bounding box.

In some example embodiments, the ADAS 900a may generate an output signal based on detection of one or more objects in the depth image (e.g., based on the depth image), which includes detection of the one or more objects in the surrounding environment. The output signal may be generated based on determination of an event associated with the vehicle 100, where the event may be determined based on detection of the one or more objects in the depth image.

As shown in FIG. 2, the ADAS 900a may be communicatively coupled to a set of one or more output interfaces 980 of the vehicle 100. The one or more output interfaces 980 may include one or more display interfaces, audio output interfaces (e.g., speakers), vibration motors, any combination thereof, or the like. In some example embodiments, the ADAS 900a may generate (e.g., transmit) an output signal that causes one or more output interfaces 980 to provide a notification message to one or more occupants (e.g., users) of the vehicle 100. For example, the ADAS 900a may generate an output signal that includes information that may be processed by one or more output interfaces 980 to cause the one or more output interfaces 980 to provide a notification message that indicates to one or more occupants of the vehicle 100 that the vehicle 100 is being or should be driven along one or more particular driving trajectories based on the information in the output signal.

As shown in FIG. 2, the ADAS 900a may be communicatively coupled to a set of one or more driving control elements 990 of the vehicle 100. The one or more driving control elements 990 may include one or more devices, control systems, or the like which are configured to control one or more aspects of driving the vehicle 100, including a braking control system, a drive throttle control system, a motor control system, a steering control system, any combination thereof, or the like, such that the one or more driving control elements 990 may, collectively or individually, at least partially control driving of the vehicle 100 through the surrounding environment. Controlling driving of the vehicle 100 through the surrounding environment may include causing the vehicle to be at least partially driven (e.g., steered, accelerated, moved, etc.) through the surrounding environment, including implementing autonomous driving of the vehicle 100, driving the vehicle 100 as an autonomous vehicle, or the like. In some example embodiments, the ADAS 900a may generate (e.g., transmit) an output signal that causes one or more driving control elements 990 to cause the vehicle 100 to be driven along a particular path (e.g., driving trajectory) through the surrounding environment. For example, the ADAS 900a may generate an output signal that includes information that may be processed by one or more driving control elements 990 to cause the one or more driving control elements 990 to generate a driving trajectory based on the information in the output signal and to further at least partially drive the vehicle 100 along the driving trajectory.

The one or more output interfaces 980 and the one or more driving control elements 990 may each be included in, may include, and/or may be implemented by, one or more instances of processing circuitry such as hardware including logic circuits; a hardware/software combination such as a processor executing software; or a combination thereof. In some example embodiments, the one or more output interfaces 980 and the one or more driving control elements 990 may be included in, may include, and/or may be implemented by the same one or more instances of processing circuitry described above with reference to ADAS 900a (e.g., processing circuit 1000a and memory 1100). For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. In some example embodiments, the processing circuitry may include a non-transitory computer readable storage device (e.g., memory 1100), for example a solid state drive (SSD), storing a program of instructions, and a processor configured to execute the program of instructions to implement the functionality of the one or more output interfaces 980 and/or the one or more driving control elements 990 may.

Figure 3A:
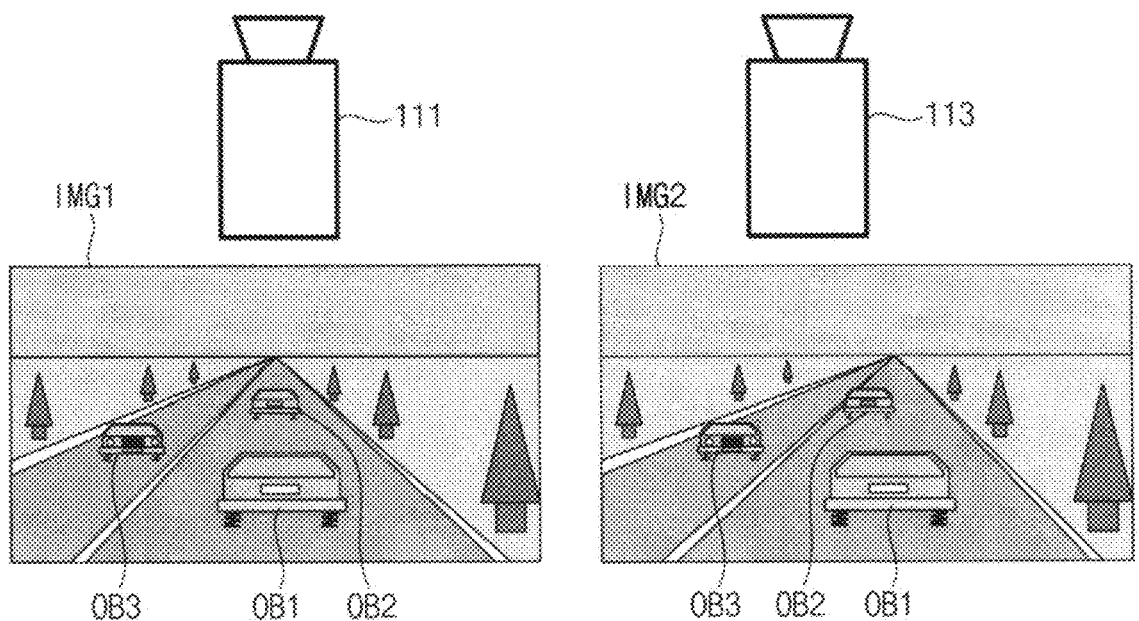
FIGS. 3A and 3B illustrate objects in the first view point image and the second view point image according to positions of the first camera and the second camera in FIG. 2, respectively.
Figure 3B:
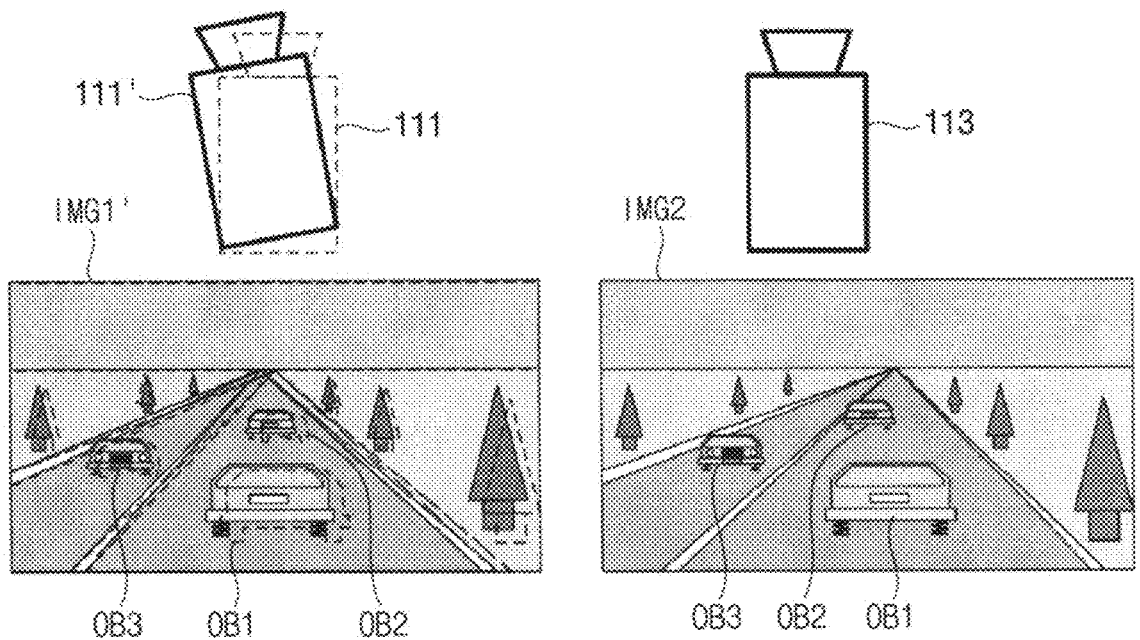

FIGS. 3A and 3B illustrate objects in the first view point image and the second view point image according to positions of the first camera and the second camera in FIG. 2, respectively.

FIG. 3A illustrates the first view point image IMG1 and the second view point image IMG2 when the first camera 111 and the second camera 113 are positioned at their original positions. If calibration information on the first camera 111 and the second camera 113 may be obtained, depth information on objects OB1, OB2 and OB3 in the surrounding environment may be accurately obtained by using disparity information between the first view point image IMG1 and the second view point image IMG2.

FIG. 3B illustrates that a physical position of the first camera 111 is changed from its original position. When the physical position of the first camera 111 is changed to a position 111', the first view point image IMG1 is changed to a first view point image IMG1' and positions of objects OB1, OB2 and OB2 in the first view point image IMG1' are also changed. Therefore, disparity information between the first view point image IMG1' and the second view point image IMG2, which the processing circuit 1000a is changed and accuracy of depth information on the objects OB1, OB2 and OB3 based on the disparity information is decreased. Dotted lines in the first view point image IMG1' denote the objects OB1, OB2 and OB3 before the physical position of the first camera 111 is changed and solid lines in the first view point image IMG1' denote the objects OB1, OB2 and OB3 after the physical position of the first camera 111 is changed.

Figure 4:
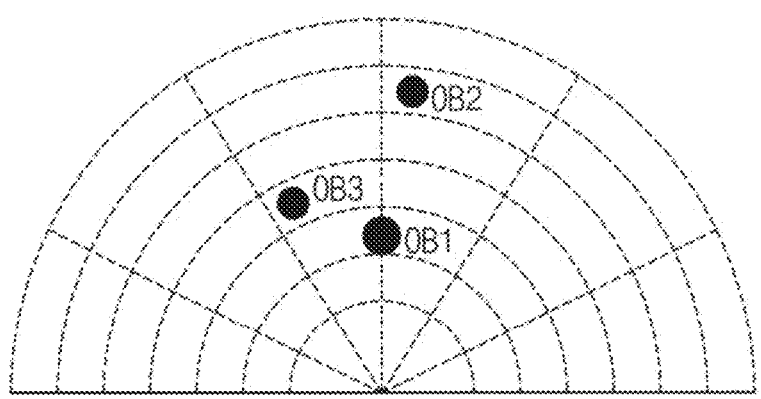
FIG. 4 illustrates an object tracking list which is generated based on a first sensing data obtained by the second sensor in FIG. 2.

FIG. 4 illustrates an object tracking list which is generated based on a first sensing data obtained by the second sensor in FIG. 2.

Referring to FIG. 4, an object tracking list OTL may represent a distance and velocity of each of the objects OB1, OB2 and OB3 from the radar 120 based on the first sensing data SD1 obtained by the radar 120. That is, the object tracking list OTL may represent (e.g., include) depth information on (e.g., associated with) each of the objects OB1, OB2 and OB3.

Figure 5:
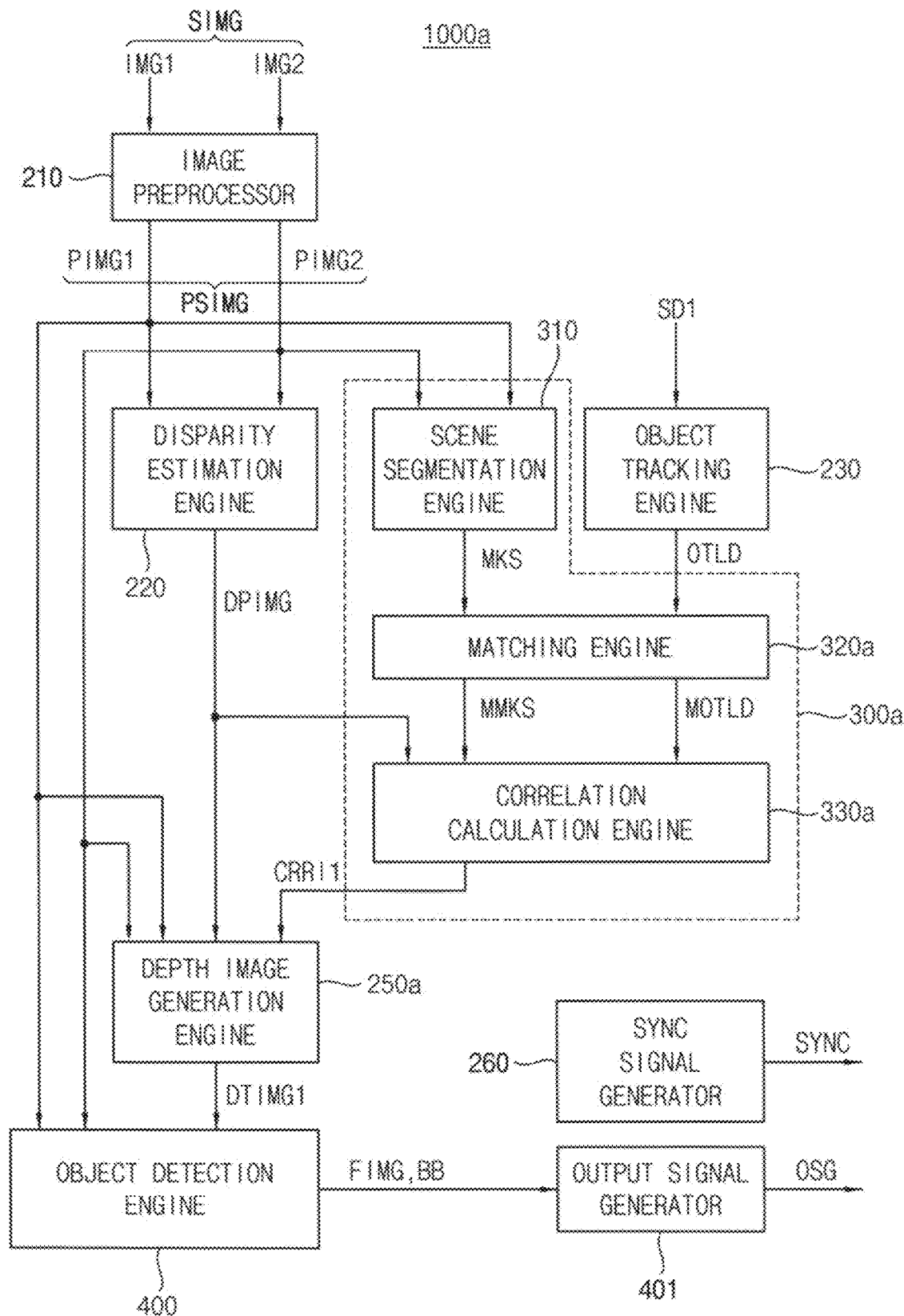
FIG. 5 is a block diagram illustrating an example of the processing circuit in the ADAS in FIG. 2 according to some example embodiments.

FIG. 5 is a block diagram illustrating an example of the processing circuit in the ADAS in FIG. 2 according to some example embodiments. Each of the elements shown in FIG. 5 may be implemented by the ADAS 900a shown in FIG. 2, for example based on the processing circuit 1000a executing a program of instructions stored at the memory 1100.

Referring to FIG. 5, the processing circuit 1000a may include an image pre-processor 210, a disparity estimation engine 220, an object tracking engine 230, a correlation calculation module 300a, a depth image generation engine 250a, a synchronization signal generator 260 and an object detection engine 400.

The image pre-processor 210 may pre-process the stereo image SIMG to output a pre-processed stereo image PSIMG including a first pre-processed viewpoint image PIMG1 and a second pre-processed viewpoint image PIMG2. The image pre-processor 210 may perform noise reduction, rectification, calibration, color enhancement, color space conversion, interpolation, and camera gain control on the stereo image SIMG. The image pre-processor 210 may output the pre-processed stereo image PSIMG which is more clear than the stereo image SIMG.

According to some example embodiments, the processing circuit 1000a may not include the image pre-processor 210 and in this case, the stereo image SIMG including at least one of the first view point image IMG1 and the second view point image IMG2 may be provided to the disparity estimation engine 220 and the correlation calculation module 300a.

The disparity estimation engine 220 may generate a disparity image DPIMG including the disparity information based on the first pre-processed viewpoint image PIMG1 and the second pre-processed viewpoint image PIMG2. The disparity estimation engine 220 may output the disparity image DPIMG including the disparity information based on performing stereo matching on corresponding pixels of the first pre-processed viewpoint image PIMG1 and the second pre-processed viewpoint image PIMG2. The disparity estimation engine 220 may output the disparity image DPIMG based on a difference between pixel values of corresponding pixels of the first pre-processed viewpoint image PIMG1 and the second pre-processed viewpoint image PIMG2. In some example embodiments, the image pre-processor 210 may be omitted, and the disparity estimation engine 220 may output the disparity image DPIMG including the disparity information (e.g., generate the disparity information) based on a difference between pixel values of corresponding pixels of the first viewpoint image IMG1 and the second viewpoint image IMG2 and/or the disparity estimation engine 220 may output the disparity image DPIMG including the disparity information (e.g., generate the disparity information) based on performing stereo matching on the corresponding pixels of the first viewpoint image IMG1 and the second viewpoint image IMG2.

The object tracking engine 230 may provide an object tracking list data OTLD including distance information with respect to the at least one object based on the first sensing data corresponding to reflecting waves from the at least one object.

The correlation calculation module 300a may calculate correlation information CRRI1 based on pre-processed stereo image PSIMG, the object tracking list data OTLD and the disparity image DPIMG including the disparity information and may provide the correlation information CRRI1 to the depth image generation engine 250a.

The correlation calculation module 300a may include a scene segmentation engine 310, a matching engine 320a and a correlation calculation engine 330a.

The scene segmentation engine 310 may segment the at least one object from at least one of the first pre-processed viewpoint image PIMG1 and the second pre-processed viewpoint image PIMG2 (or from at least one of the first viewpoint image IMG1 and the second viewpoint image IMG2) to extract at least one mask MKS. The matching engine 320a may perform a matching operation on the at least one mask MKS and the object tracking list data OLTD (which may include distance information associated with the at least one object) to output matching results MMKS and MOLTD to the correlation calculation engine 330a. The matching results MMKS and MOLTD may include a first matching result MMKS on the mask MKS and a second matching result MOTLD on the object tracking list data OLTD. The first matching result MMKS on the mask MKS may distinguish the at least one object.

The correlation calculation engine 330a may receive the matching results MMKS and MOLTD and the disparity image DPIMG including the disparity information, may calculate the correlation information CRRI1 between the depth information and the disparity information based on the matching results MMKS and MOLTD and the disparity information and may provide the correlation information CRRI1 to the depth image generation engine 250a.

The depth image generation engine 250a may correct depth values of the pre-processed stereo image PSIMG based on the disparity information and the correlation information CRRI1 to generate a depth image DTIMG1 with respect to the pre-processed stereo image PSIMG and may provide the depth image DTIMG1 to the object detection engine 400. In some example embodiments, the depth image generation engine 250a may correct depth values of the disparity image DPIMG based on the correlation information CRRI1 to generate the depth image DTIMG1. The depth image generation engine 250a may generate the depth image DTIMG1 such that each separate pixel of the depth image DTIMG1 is associated with a separate depth value.

For example, the depth image generation engine 250a may correct depth values of the pre-processed stereo image PSIMG the based on equation 1.

$$Z=(B\times f\times s)/d \qquad \text{[Equation 1]}$$

In equation 1, Z denotes a depth value, B denotes a baseline, which is a distance between the first camera 111 and the second camera 112, f denotes a camera focal length of the first camera 111 and the second camera 112, d denotes a disparity, and s corresponds to the correlation information CRRI1.

The object detection engine 400 may detect the at least one object in the pre-processed stereo image PSIMG to output a final image FIMG including the detected at least one object or to output a bounding box BB marking the detected at least one object in the final image FIMG.

The synchronization signal generator 260 may generate a synchronization signal SYNC based on frame information FRMI1. The frame information FRMI1 may include a first frames per second (FPS) on the stereo image SIMG and a second FPS on the object tracking list data OLTD. The first FPS on the pre-processed stereo image PSIMG may be different from the second FPS on the object tracking list data OLTD. The synchronization signal generator 260 may synchronize the pre-processed stereo image PSIMG and the object tracking list data by using the synchronization signal SYNC.

The processing circuit 1000a may display the final image FIMG including the detected at least one object or the bounding box BB marking the detected at least one object on a display or a head-up display (HUD) of the driving vehicle.

The output signal generator 401 may generate an output signal OSG based on the final image FIMG and/or bounding box BB (e.g., based on the depth image DTIMG1). The output signal generator 401 may generate an output signal OSG that causes one or more output interfaces 980 of the vehicle 100 to provide one or more notification messages and/or causes one or more driving control elements 990 to partially or entirely control driving of the vehicle 100 along a particular driving trajectory, based at least in part upon detection of the at least one object in the depth image DTIMG1.

According to some example embodiments, since the FPS of the stereo image SIMG is faster than the FPS of the object tracking list data OLTD, the correlation calculation module 300a may be updated more slowly than the image pre-processor 210, the disparity estimation engine 220 and the depth image generation engine 250a.

Figure 6:
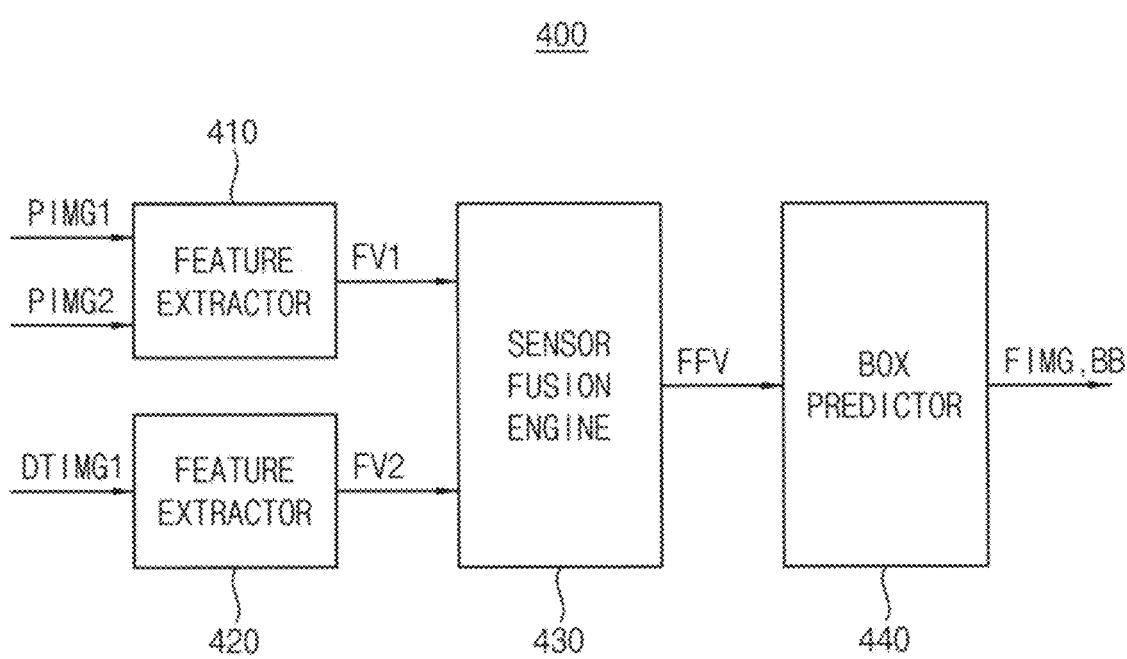
FIG. 6 is a block diagram illustrating an example of the object detection engine in FIG. 5 according to some example embodiments.

FIG. 6 is a block diagram illustrating an example of the object detection engine in FIG. 5 according to some example embodiments.

Referring to FIG. 6, the object detection engine 400 may include a first feature extractor 410, a second feature extractor 420, a sensor fusing engine 430 and a box predictor 440.

The first feature extractor 410 may extract features of at least one of the first pre-processed viewpoint image PIMG1 and the second pre-processed viewpoint image PIMG2 to provide a first feature vector FV1. The second feature extractor 420 may extract features of the depth image DTIMG1 to provide a second feature vector FV2. The sensor fusing engine 430 may fuse the first feature vector FV1 and the second feature vector FV2 based on a convolutional neural network (CNN) to provide a fused feature vector FFV.

The box predictor 440 may detect an object in the fused feature vector FFV based on a neural network and may output the final image FIMG including the detected at least one object or output the bounding box BB marking the detected at least one object. Accordingly, the box predictor 440 may detect an object in the depth image DTIMG1. According to some example embodiments, the box predictor 440 may mark the object in the final image in three-dimensions with the bounding box to output the marked object or convert the final image in three-dimensions to a bird-eye view image in two-dimensions, and mark the object in the bird-eye view image with the bounding box to output the marked object.

Figure 7:
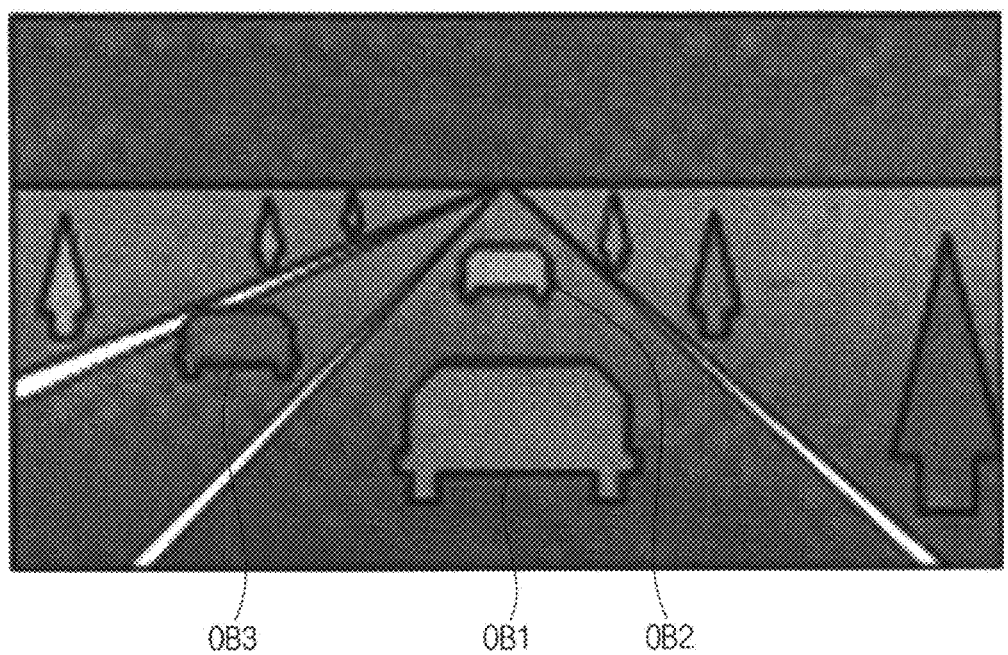
FIG. 7 illustrates an example of the disparity image in the processing circuit in FIG. 5.

FIG. 7 illustrates an example of the disparity image in the processing circuit in FIG. 5.

Referring to FIGS. 5 and 7, the disparity estimation engine 220 may output the disparity image DPIMG based on a difference between pixel values of corresponding pixels of the first pre-processed viewpoint image PIMG1 and the second pre-processed viewpoint image PIMG2.

Figure 8:
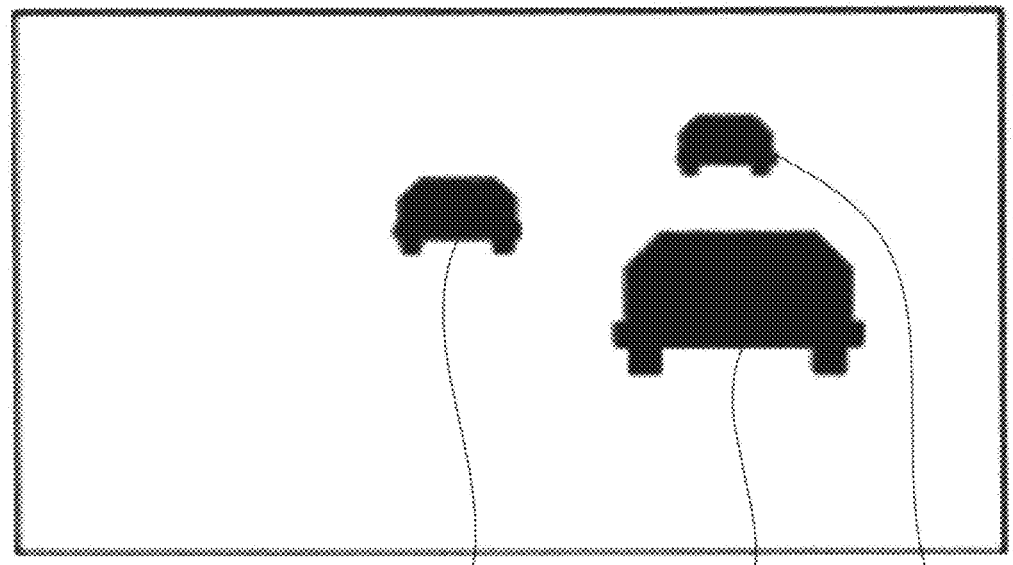
FIG. 8 illustrates an example of the mask in the processing circuit in FIG. 5.

FIG. 8 illustrates an example of the mask in the processing circuit in FIG. 5.

Referring to FIGS. 5 and 8, the scene segmentation engine 310 may segment the at least one object from at least one of the first pre-processed viewpoint image PIMG1 and the second pre-processed viewpoint image PIMG2 to extract masks MKS. The masks MSK may be represented as the same color without respect to a distance from the baseline.

Figure 9:
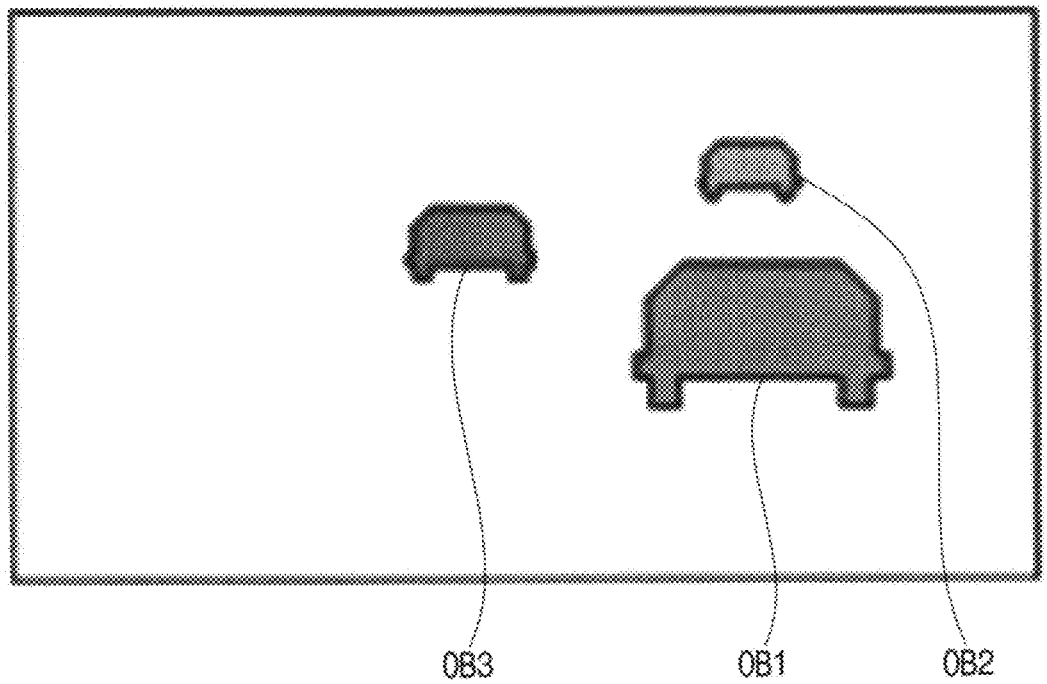
FIG. 9 illustrates an example that in which the correlation calculation engine in the processing circuit in FIG. 5 combines the disparity image and the mask.

FIG. 9 illustrates an example that in which the correlation calculation engine in the processing circuit in FIG. 5 combines the disparity image and the mask.

Referring to FIGS. 5 and 9, the correlation calculation engine 330a may combine the disparity image DPIMG and the masks MSK to represent masks MSK with different identifiers according to distance of the objects OB1, OB2 and OB3 from the baseline.

Figure 10:
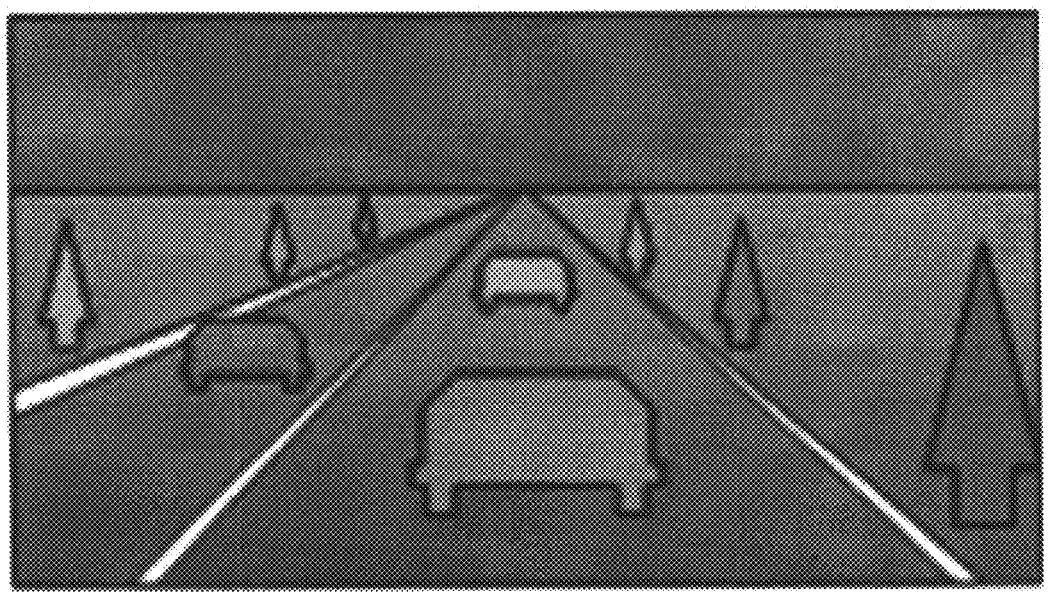
FIG. 10 illustrates an example of the depth image in the processing circuit in FIG. 5.

FIG. 10 illustrates an example of the depth image in the processing circuit in FIG. 5.

Referring to FIGS. 5 and 10, the depth image generation engine 250a may correct depth values of the pre-processed stereo image PSIMG based on the disparity information and the correlation information CRRI1 to generate the depth image DTIMG1 with respect to the pre-processed stereo image PSIMG.

Figure 11:
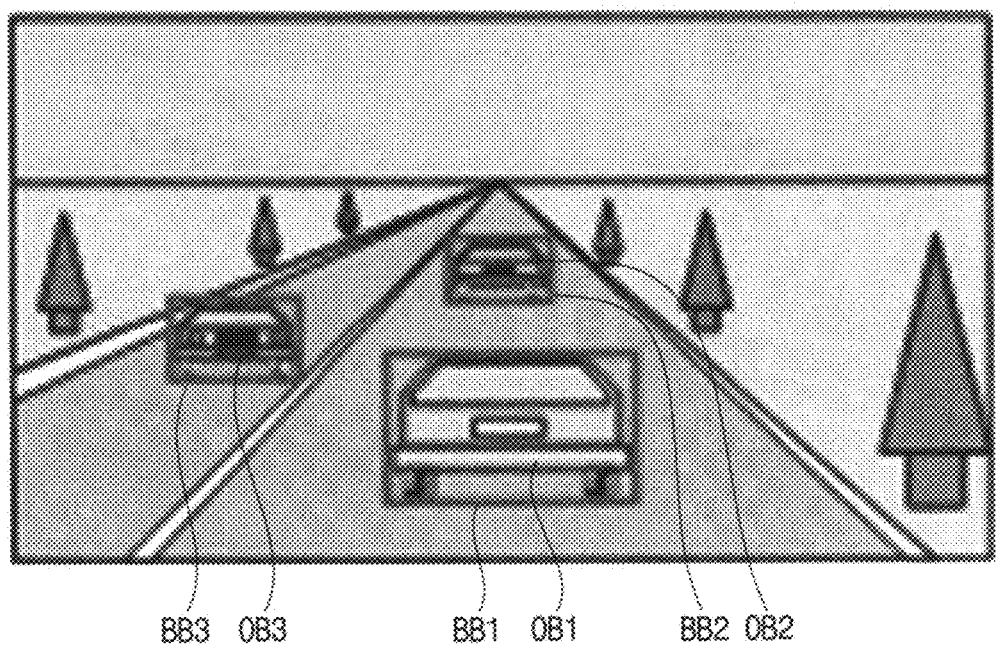
FIGS. 11 and 12 illustrate examples of the final image in the processing circuit in FIG. 5.
Figure 12:
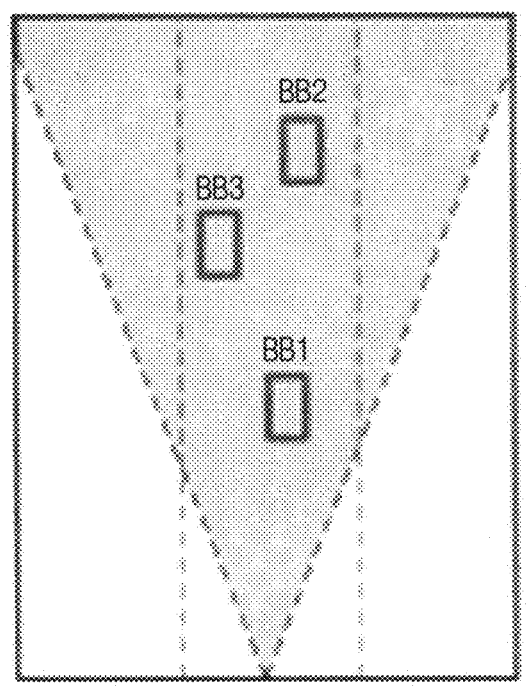

FIGS. 11 and 12 illustrate examples of the final image in the processing circuit in FIG. 5.

Referring to FIGS. 5 and 11, the box predictor 440 may mark the objects OB1, OB2 and OB2 with bounding boxes BB1, BB2 and BB3 in the final image FIMG and outputs a final image FIMG1 marked with the bounding boxes BB1, BB2 and BB3.

Referring to FIGS. 5 and 12, the box predictor 440 may convert the final image FIMG in three-dimension to a bird-eye view image in two-dimension, mark the object in the bird-eye view image with the bounding boxes BB1, BB2 and BB3 to a final image FIMG2 marked with the bounding boxes BB1, BB2 and BB3.

In some example embodiments, the processing circuit 1000a may determine whether a driving event occurs based on the sequential change with respect to the bounding boxes BB1, BB2 and BB3 and may provide a user with a notification message notifying the driving event.

Figure 13:
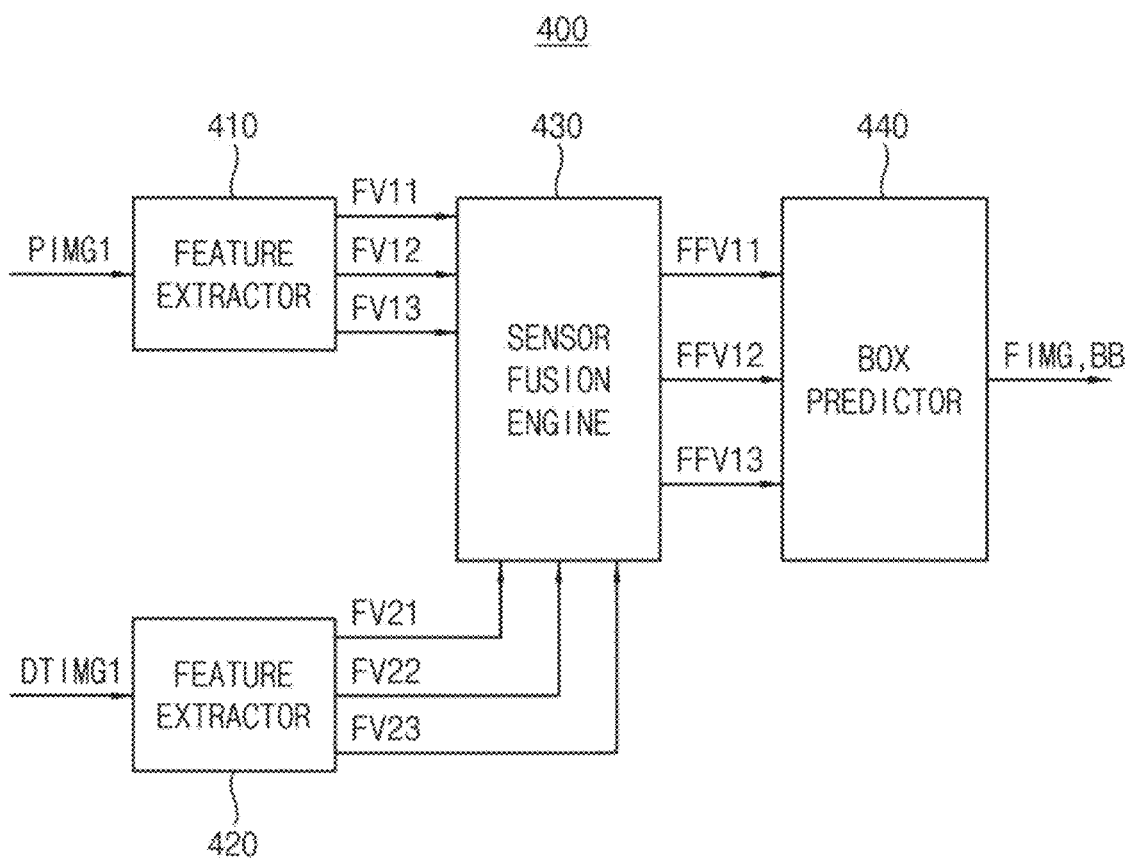
FIG. 13 illustrates an operation of the object detection engine of FIG. 6.

FIG. 13 illustrates an operation of the object detection engine of FIG. 6.

Referring to FIG. 13, the first feature extractor 410 may extract features the first pre-processed viewpoint image PIMG1 to provide first feature vector FV111, FV12 and FV13 and the second feature extractor 420 may extract features of the depth image DTIMG1 to provide second feature vectors FV21, FV22 and FV23. The sensor fusing engine 430 may fuse the first feature vectors FV111, FV12 and FV13 and the second feature vectors FV21, FV22 and FV23 based on a CNN to provide fused feature vectors FFV11, FFV12 and FFV13. The box predictor 440 may detect an object in the fused feature vectors FFV11, FFV12 and FFV13 and may output the final image FIMG including the detected object marked with a bounding box.

Figure 14:
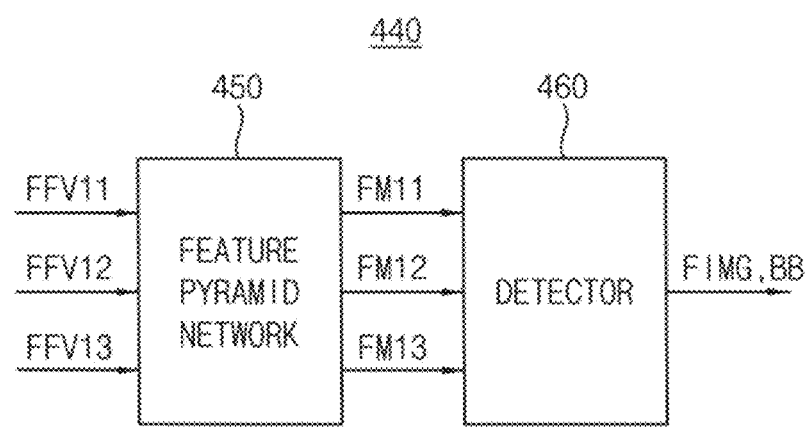
FIG. 14 is a block diagram illustrating an example of the box predictor in the object detection engine of FIG. 13.

FIG. 14 is a block diagram illustrating an example of the box predictor in the object detection engine of FIG. 13.

Referring to FIG. 14, the box predictor 440 may include a feature pyramid network 450 and a detector 460.

The feature pyramid network 450 may generate high-resolution feature maps FM11, FM12 and FM13 based on the fused feature vectors FFV11, FFV12 and FFV13 and may provide the high-resolution feature maps FM11, FM12 and FM13 to the detector 460. The detector 460 may detect at least one object in the high-resolution feature maps FM11, FM12 and FM13 and may output the final image FIMG including the detected object marked with a bounding box.

Figure 15A:
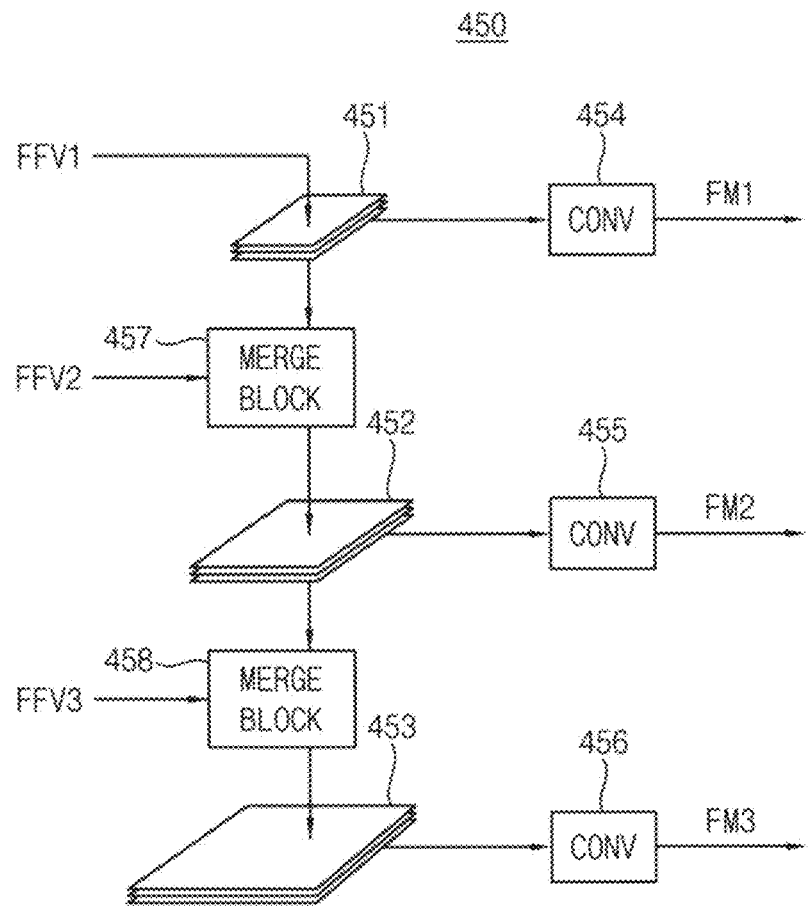
FIG. 15A illustrates an example of the feature pyramid network in the box predictor of FIG. 14.

FIG. 15A illustrates an example of the feature pyramid network in the box predictor of FIG. 14.

Referring to FIG. 15A, the feature pyramid network 450 may generate the high-resolution feature maps FM11, FM12 and FM13 based on the fused feature vectors FFV11, FFV12 and FFV13. The feature pyramid network 450 may include a plurality of layers 451, 452 and 452, a plurality of merge blocks 457 and 458 and a plurality of convolution kernels 454, 455, 456. The number of the layers and the convolution kernels are not limited thereto.

The layer 451 up-samples the fused feature vector FFV1 and the convolution kernel 454 applies a convolution conversion to an output of the layer 451 to output the feature map FM1. The merge block 457 merges the output of the layer 451 and the fused feature vector FFV2 and provides merged output.

The layer 452 up-samples the output of the merge block 457 and the convolution kernel 455 applies a convolution conversion to an output of the layer 452 to output the feature map FM2.

The merge block 458 merges the output of the layer 452 and the fused feature vector FFV3 and provides merged output. The layer 452 up-samples the output of the merge block 458 and the convolution kernel 456 applies a convolution kernel to an output of the layer 452 to output the feature map FM3.

Figure 15B:
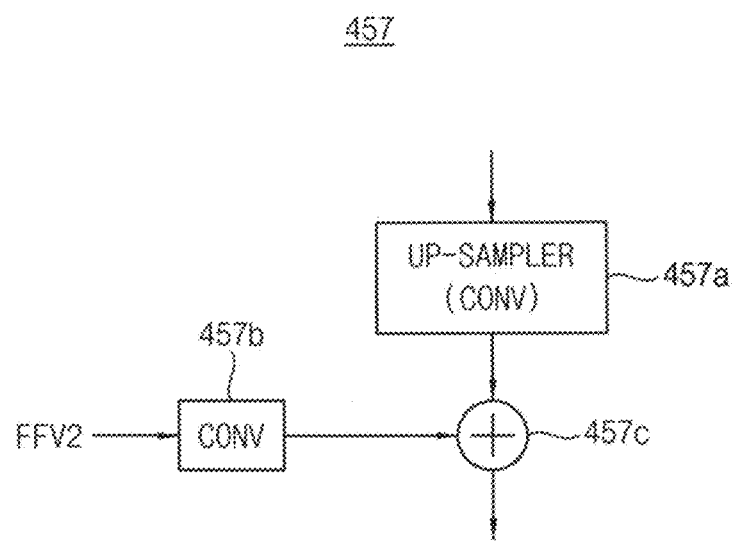
FIG. 15B illustrates an example of the merge block in the feature pyramid network of FIG. 15A.

FIG. 15B illustrates an example of the merge block in the feature pyramid network of FIG. 15A.

Referring to FIG. 15B, the merge block 457 may include an up-sampler 457*a*, a convolutional layer (kernel) 457*b* and a summer 457*c*.

The up-sampler 457*a* up-samples the output of the layer 451 and provides up-sampled output to the summer 457*c*. The up-sampler 457*a* may include a convolution layer CONV. The convolution layer CONV applies to a convolution conversion to the fused feature vector FFV2 to provide converted output to the summer 457*c*. The summer 457*c* sums the output of the up-sampler 457*a* and the output of the convolution layer 457*b* and provides summed result to the layer 452.

FIG. 16 is a flow chart illustrating a method of detecting an object in the ADAS in FIG. 2 according to some example embodiments. The method shown in FIG. 16 may be implemented by some or all of the ADAS 900*a* shown in FIG. 2.

Referring to FIGS. 2 through 16, the processing circuit 1000*a* obtains the stereo image SIMG from the stereo camera 110 in operation S110, obtains radar reflected waves from the second sensor 120, and generate the object tracking list data OTLD indicating distance (depth) information to at least one object based on the radar reflected waves in operation S120.

The processing circuit 1000*a* generates disparity image DPIMG including the disparity information between a first viewpoint image IMG1 and a second viewpoint image IMG2 in the stereo image SIMG in operation S130 and generates mask MKS that distinguishes the at least one object in operation S140.

The processing circuit 1000*a* calculates correlation information CRRI1 between the depth information and the disparity information of the stereo image SIMG based on mask MKS and the object tracking list data OTLD in operation S150. The processing circuit 1000*a* corrects depth values of the stereo image SIMG based on the disparity information and the correlation information CRRI1 to generate a depth image DTIMG with respect to the stereo image SIMG in operation S160.

The processing circuit 1000*a* detects an object in the stereo image SIMG using the disparity information and the correlation information CRRI1, based on neural network, and provides the final image FIMG including the detected object or provides an image including the detected object marked with the bounding box BB in operation S170.

In operation S171, the processing circuit 1000*a* may generate an output signal, which may include a notification message, a control signal, information that may be used to generate any of same, based on the final image and/or detected object.

In some example embodiments, operation S171 may include outputting ("transmitting") an output signal that includes information associated with the detected object and causes one or more output interfaces 980 to provide (e.g., generate) a notification message. The notification message may be provided as an audio, a video, and/or vibration to an occupant of the vehicle 100.

In some example embodiments, operation 171 may include outputting a an output signal that includes a control signal, also referred to herein as a command, for one or more driving control elements 990 and/or information that causes one or more driving control elements 990 to generate one or more control signals that cause the one or more driving control elements 990 to control one or more aspects of driving the vehicle 100, including steering control, brake control, throttle control, any combination thereof, or the like, to control a driving trajectory of the vehicle 100. Accordingly, in some example embodiments, operation S171 may include controlling the driving trajectory of the vehicle 100, via one or more output signals transmitted to one or more driving control elements 990.

Figure 17:
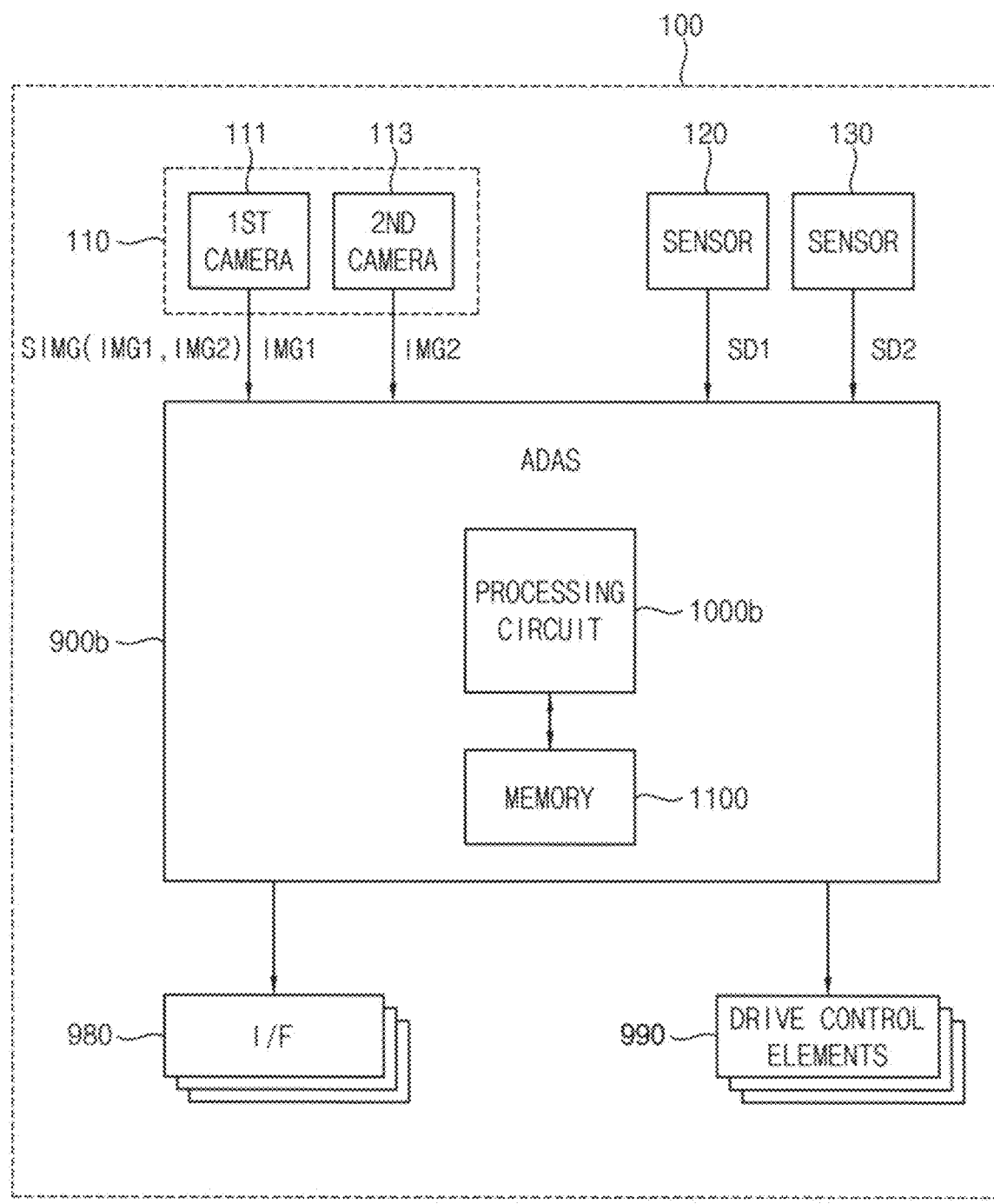
FIG. 17 is a block diagram illustrating another example of an ADAS according to some example embodiments.

FIG. 17 is a block diagram illustrating another example of an ADAS according to some example embodiments.

Referring to FIG. 17, an ADAS 900*b* may include a processing circuit 1000*b* and a memory 1100.

In FIG. 17, a first sensor 110, a second sensor 120 and a third sensor 130 which are mounted in the vehicle 100 are illustrated together for convenience of explanation. The first sensor 110 may be a stereo camera and may include a first camera 111 and a second camera 112. The second sensor 120 may be a radar to generate distance information and the third sensor 130 may be LiDAR to generate depth information.

The processing circuit 1000*b* in FIG. 17 differs from the processing circuit 1000*a* in that the processing circuit 1000*b* further receives a second sensing data SD2 from the third sensor 130, which is a LiDAR.

The third sensor 130, which is a LiDAR, radiates radio light, receives reflected light from the object and provides the reflected light to the processing circuit 1000*b* as the second sensing data SD2.

The memory 1100 stores instructions executable by the processing circuit 1000*b* and the processing circuit 1000*b* executes the instructions to cause the ADAS 900*b* to obtain, from the vehicle 100, a stereo image SIMG including captured while driving the vehicle 100, to calculate disparity information of the stereo image by performing stereo matching on the first viewpoint image IMG1 and the second viewpoint image IMG2 in the stereo image including SIMG, to obtain the first sensing data SD1 to generate an object tracking list which is matched with at least one object in the stereo image, to obtain the second sensing data SD2 to generate spatial point cloud data with respect to the at least one object, to segment the at least one object in the stereo image SIMG to extract at least one mask and to match the at least one mask, the object tracking list and the spatial point cloud data. The processing circuit 1000b executes the instructions to cause the ADAS 900b to calculate correlation information between the depth information and the disparity information based on a result of the matching and the disparity information to correct depth values of the stereo image SIMG based on the correlation information to generate a depth image of the stereo image SIMG, to detect the object in the depth image, and to mark the detected object with a bounding box.

Figure 18:
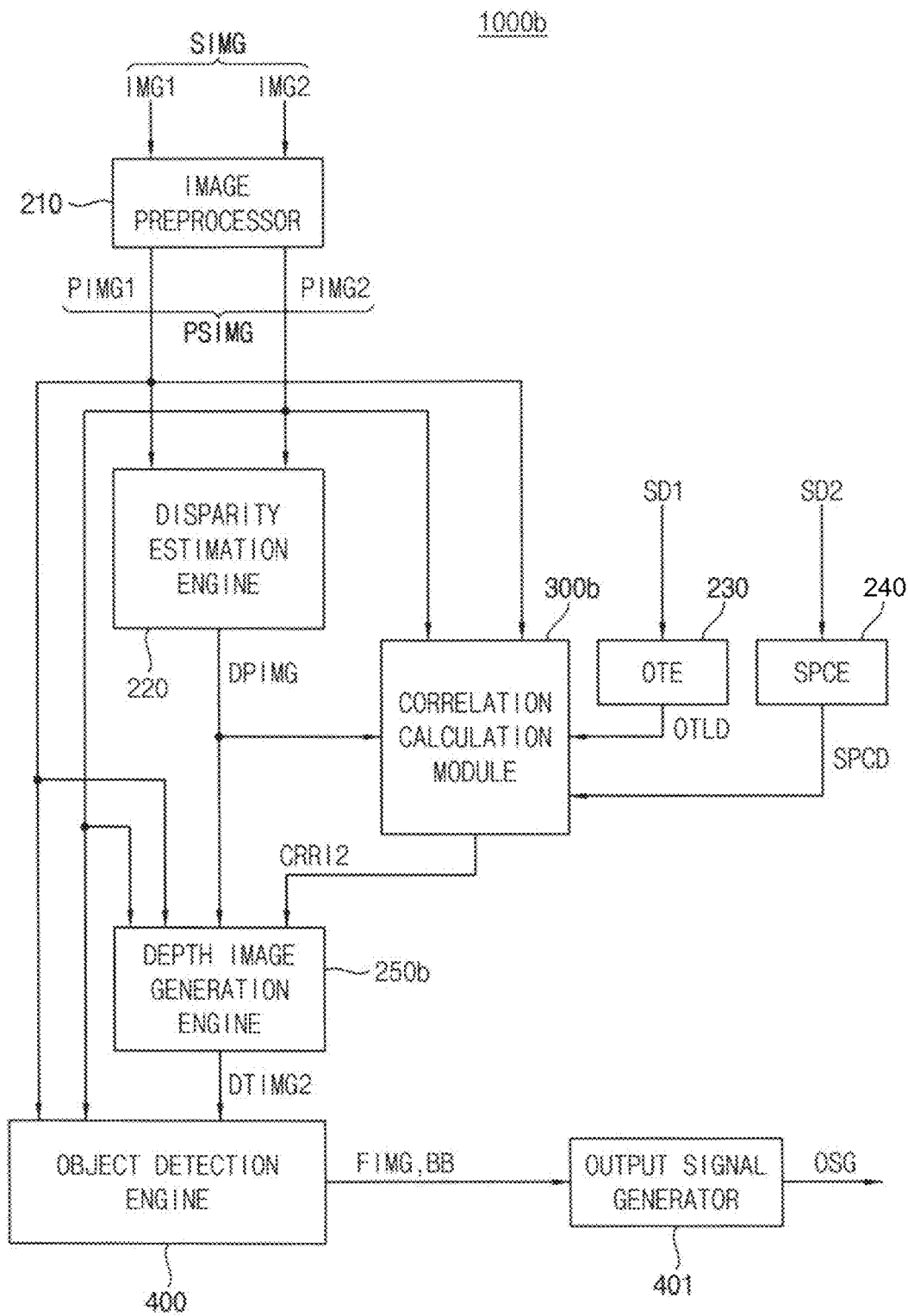
FIG. 18 is a block diagram illustrating an example of the processing circuit in the ADAS in FIG. 17 according to some example embodiments.

FIG. 18 is a block diagram illustrating an example of the processing circuit in the ADAS in FIG. 17 according to some example embodiments. Each of the elements shown in FIG. 18 may be implemented by the ADAS 900b shown in FIG. 17, for example based on the processing circuit 1000b executing a program of instructions stored at the memory 1100.

Referring to FIG. 18, the processing circuit 1000b may include an image pre-processor 210, a disparity estimation engine 220, an object tracking engine 230, a spatial point cloud engine 240, a correlation calculation module 300b, a depth image generation engine 250b, a synchronization signal generator 260 and an object detection engine 400.

The processing circuit 1000b of FIG. 18 differs from the processing circuit 1000a of FIG. 5 in that the processing circuit 1000b of FIG. 18 further include the spatial point cloud engine 240 and in the correlation calculation module 300b and the depth image generation engine 250b.

The spatial point cloud engine 240 receives the second sensing data SD2, which is reflected light, and provides the correlation calculation module 300b with a spatial point cloud data SPCD including spatial depth information with respect to the at least one object. Restated, the spatial point cloud engine 240 may obtain point cloud information associated with at least one object included in the stereo image SIMG based on reflected light captured at the vehicle, where the reflected light may be associated with the at least one object (e.g., reflected from a surface of the at least one object). The spatial point cloud engine 240 may calculate spatial depth information (e.g., the spatial point cloud data SPCD) based on the point cloud information.

The correlation calculation module 300b may calculate correlation information CRRI2 based on pre-processed stereo image PSIMG, the object tracking list data OTLD, the spatial point cloud data SPCD, and the disparity image DPIMG including the disparity information and may provide the correlation information CRRI2 to the depth image generation engine 250b. Restated, the correlation calculation module 300b may calculate correlation information between depth information (e.g., included in the object tracking list data OTLD and the disparity information associated with (e.g., included in) the disparity image DPIMG based on the stereo image SIMG, the depth information (e.g., OTLD), the point cloud information (e.g., SPCD), and the disparity information (e.g., included in the disparity image DPIMG).

The depth image generation engine 250b may correct depth values of the pre-processed stereo image PSIMG and/or the stereo image SIMG (e.g., when the image pre-processor 210 is omitted) based on the disparity information and the correlation information CRRI1 to generate a depth image DTIMG2 with respect to the pre-processed stereo image PSIMG and/or the stereo image SIMG and may provide the depth image DTIMG2 to the object detection engine 400.

Figure 19:
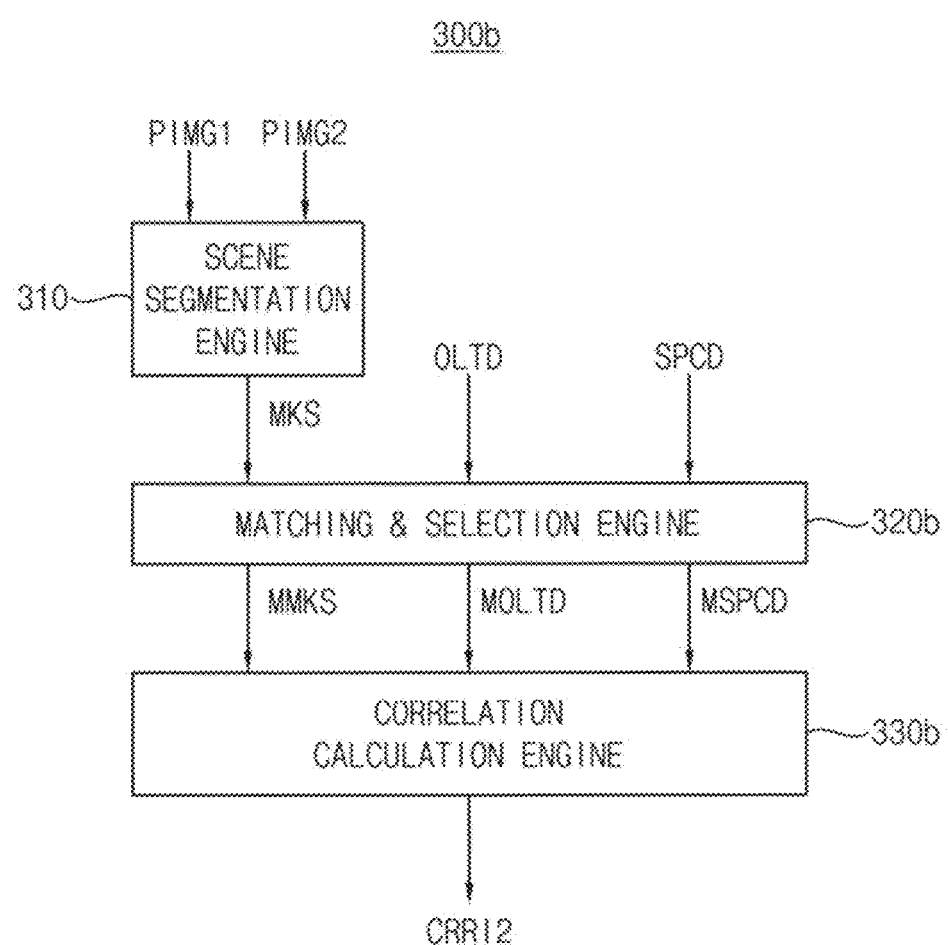
FIG. 19 is a block diagram illustrating an example of the correlation calculation module in FIG. 18 according to some example embodiments.

FIG. 19 is a block diagram illustrating an example of the correlation calculation module in FIG. 18 according to some example embodiments.

Referring to FIG. 19, the correlation calculation module 300b may include a scene segmentation engine 310, a matching engine 320b and a correlation calculation engine 330b.

The scene segmentation engine 310 may segment the at least one object from at least one of the first pre-processed viewpoint image PIMG1 and the second pre-processed viewpoint image PIMG2 to extract at least one mask MKS. The matching engine 320b may perform a matching operation on the at least one mask MKS, the object tracking list data OLTD and the spatial point cloud data SPCD to output matching results MMKS, MOLTD and MSPCD to the correlation calculation engine 330b. The matching results MMKS, MOLTD and MSPCD may include a first matching result MMKS on the mask MKS, a second matching result MOTLD on the object tracking list data OLTD and a third matching result MSPCD on the spatial point cloud data SPCD.

The correlation calculation engine 330b may receive the matching results MMKS, MOLTD and MSPCD and the disparity image DPIMG including the disparity information, may calculate the correlation information CRRI2 between the depth information and the disparity information based on the matching results MMKS, MOLTD and MSPCD and the disparity information and may provide the correlation information CRRI2 to the depth image generation engine 250b.

Figure 20:
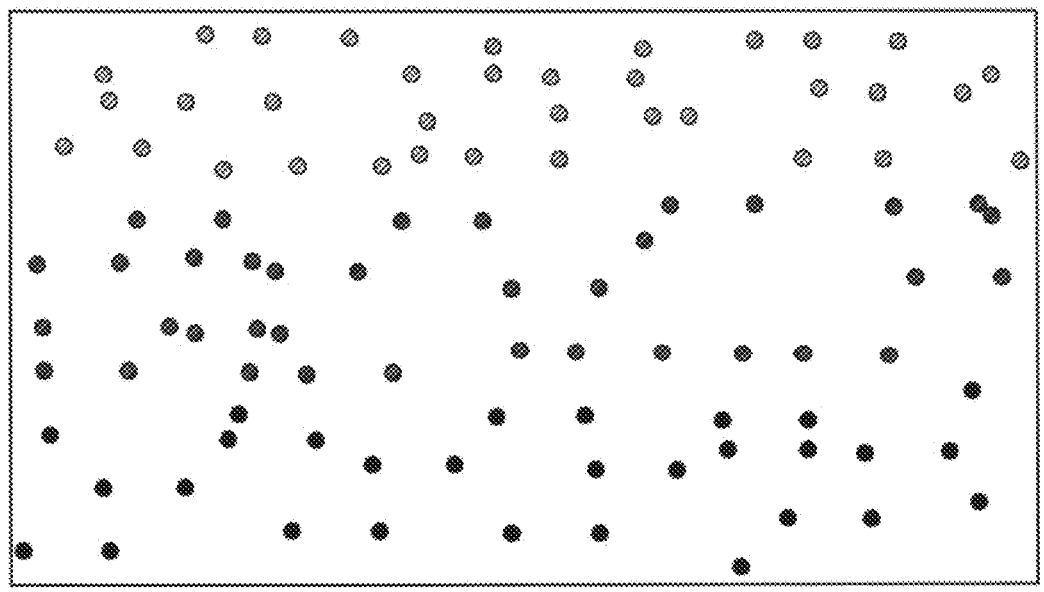
FIG. 20 illustrates an example of a point cloud image which the second sensor in FIG. 17 provides.

FIG. 20 illustrates an example of a point cloud image which the second sensor in FIG. 17 provides.

Referring to FIG. 20, the point cloud image provided from the third sensor 130, i.e., the LiDAR may represent the objects with sets of points and may represent the points with different colors according to distance of the objects from the baseline.

Figure 21:
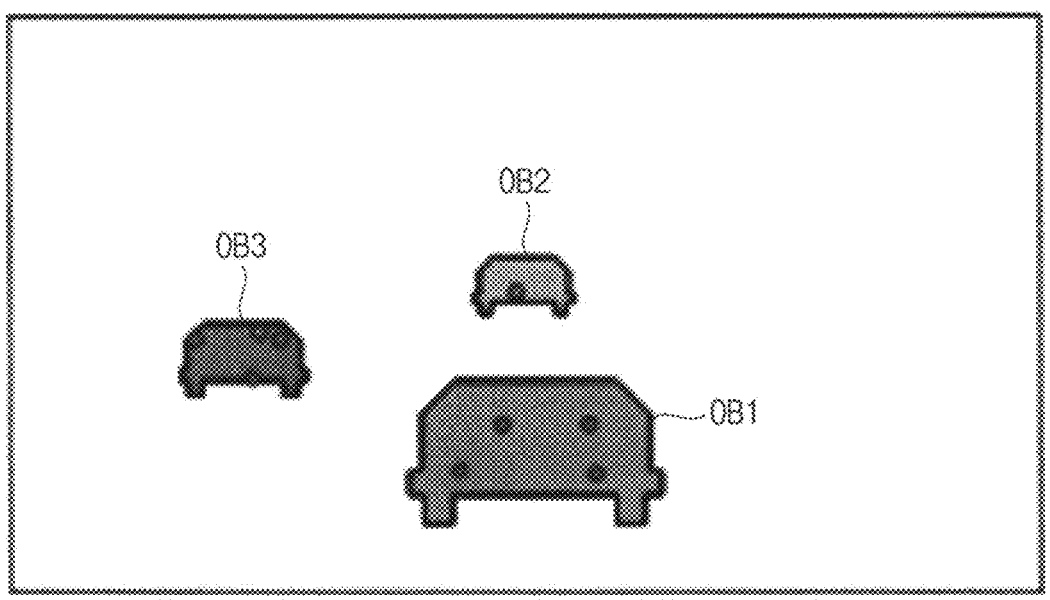
FIG. 21 illustrates an example that in which the correlation calculation engine in FIG. 19 combines the disparity image the mask and the spatial point cloud data.

FIG. 21 illustrates an example that in which the correlation calculation engine in FIG. 19 combines the disparity image the mask and the spatial point cloud data.

Referring to FIGS. 19 and 21, the correlation calculation engine 330b may combine the disparity image DPIMG, the masks MSK and point cloud information in the matching result MSPCD to represent masks MSK with different identifiers according to distance of the objects OB1, OB2 and OB3 from the baseline and may represent points in the objects OB1, OB2 and OB3.

Figure 22:
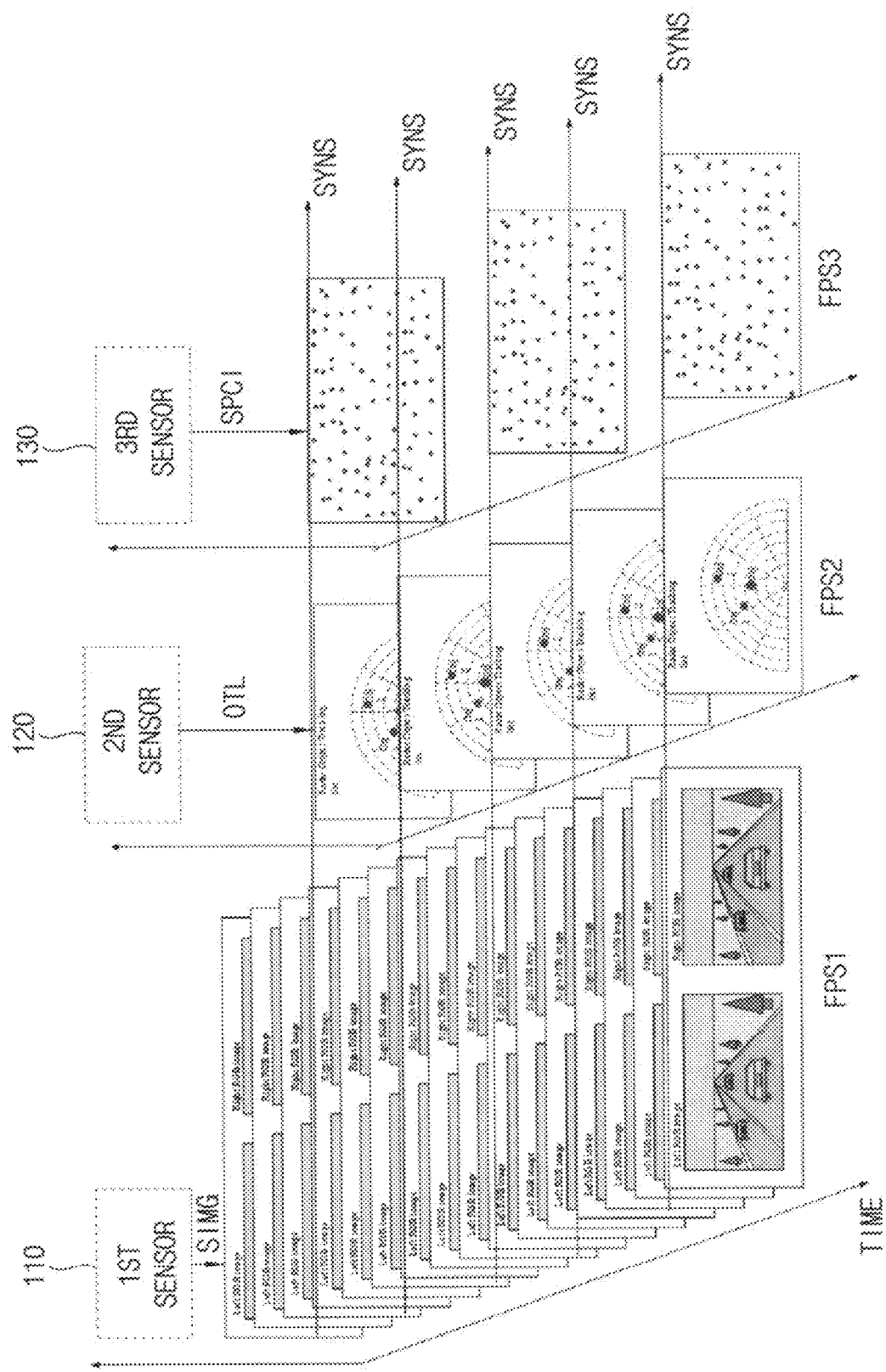
FIG. 22 illustrates an example in which the processing circuit synchronizes the stereo image, the first sensing data and the second sensing data.

FIG. 22 illustrates an example in which the processing circuit synchronizes the stereo image, the first sensing data and the second sensing data.

Referring to FIG. 22, the first sensor 110 outputs the stereo image SIMG with a first FPS FPS1, the second sensor 120 outputs the object tracking list OTL with a second FPS FPS2 and the third sensor 130 outputs the spatial point cloud image SPCI with a third FPS FPS3. The first FPS FPS1 is greater than the second FPS FPS2 and the second FPS FPS2 is greater than the third FPS FPS3.

For synchronizing images having different FPS, the processing circuit 1000b may synchronize the images having different FPS with the synchronization signal SYNS generated in the synchronization signal generator 260.

Figure 23:
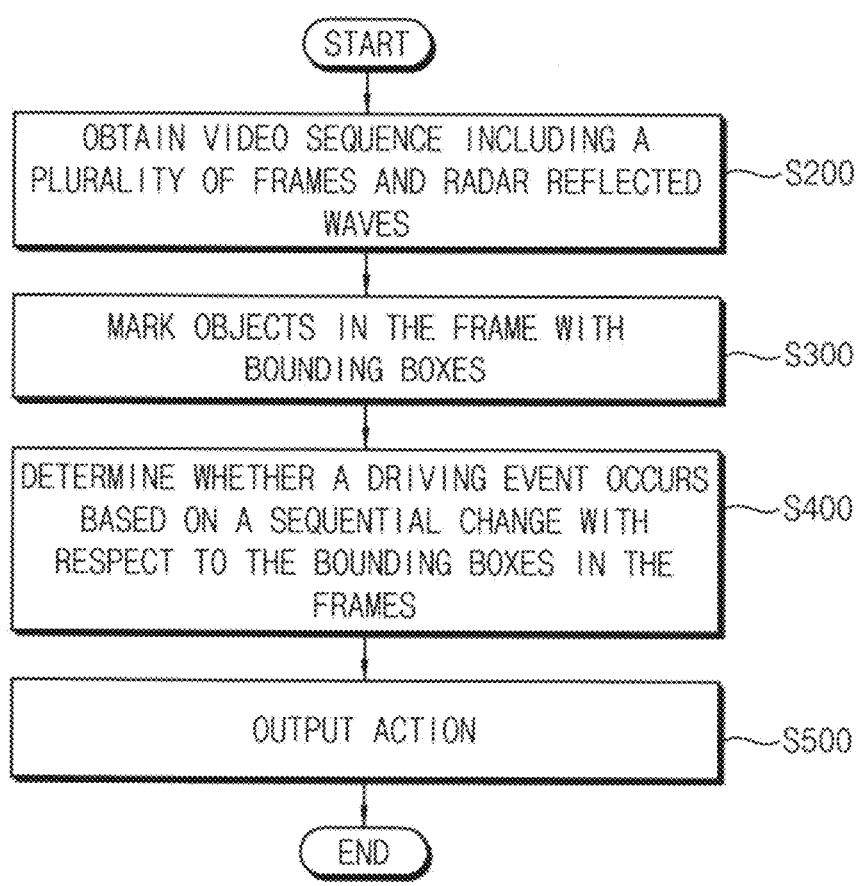
FIG. 23 is a flowchart illustrating a method of determining whether an event occurs in the ADAS according to some example embodiments.

FIG. 23 is a flowchart illustrating a method of determining whether an event occurs in the ADAS according to some example embodiments.

In operation 200, the ADAS 900 may obtain a video sequence including a plurality of frames from, for example, a camera mounted in a vehicle and may obtain radar reflected waves from a radar mounted in a vehicle. According to some example embodiments, the ADAS 900 may receive the video sequence by communicating with the camera mounted in the vehicle via a certain network and may obtain the radar reflected waves by communicating the radar mounted in the vehicle. For example, the video sequence may be a black box image of the vehicle or a stereo image received from a stereo camera of the vehicle. According to some example embodiments, the ADAS 900 may include a camera and may obtain the video sequence from the camera included in the ADAS 900.

The video sequence may include a series of still images. Each of the still images may refer to a picture or a frame.

In operation 300, the ADAS 900 may detect an object included in the plurality of frames and may mark the detected object with a bounding box. According to some example embodiments, the ADAS 900 may detect one or more objects from one frame included in the video sequence. The one or more objects detected from the frame may be detected from another frame included in the same video sequence. The one or more objects detected from the frame may not be detected from another frame included in the same video sequence. When the ADAS 900 detects the object included in the plurality of frames, the ADAS 900 may obtain disparity information between a first viewpoint image and a second viewpoint image in the stereo image, may obtain depth information to the object based on the radar reflected waves, obtain correlation information between the disparity information and the depth information, and may correct depth values of the object.

According to some example embodiments, the ADAS 900 may obtain location information of the object using, for example, an artificial intelligence (AI) learning model. For example, the ADAS 900 may recognize where the first vehicle is located in the first frame based on a bounding box of the first vehicle in the first frame. In addition, the ADAS 900 may recognize a distance between the first vehicle and the third vehicle using the bounding box of the first vehicle and a bounding box of the third vehicle in the first frame. In addition, the ADAS 900 may recognize an amount of change in a distance between the first vehicle and the third vehicle in a third frame using the bounding box of the first vehicle and the bounding box of the third vehicle in the third frame.

According to some example embodiments, the ADAS 900 may determine a type of the object. The ADAS 900 may determine whether the object is noise, based on information about an available size of the type of the object in a location in which the object is recognized.

According to some example embodiments, the ADAS 900 may determine types of the object.

According to some example embodiments, the ADAS 900 may use a first trained model in order to detect an object included in a frame and a location of the object. According to some example embodiments, the first trained model may be obtained based on a result of learning by detecting the object in a video sequence including the plurality of frames captured during driving of a vehicle and marking the detected object with a bounding box. Restated, the first trained model may be obtained based on a result of detecting a learning object from a video sequence including a plurality of learning frames captured while driving a learning vehicle. The learning object may be similar to the object included in the frame, and the learning vehicle may be similar to the vehicle 100. Thus, when the frames obtained from the video sequence are input in the first trained model, the bounding box designating the object detected from the frames may be output from the first trained model. Restated, an object may be detected in a stereo image based on inputting the stereo image to the obtained first trained model.

In operation S400, the ADAS 900 may determine whether a driving event of a vehicle occurs, by analyzing a sequential change in the bounding boxes of the objects in the plurality of frames.

According to some example embodiments, the ADAS 900 may analyze the change in the location of the bounding box between a previous frame and a next frame, based on a display order of the video sequence. For example, the ADAS 900 may analyze the change in the location of the bounding box, by comparing location information of the bounding box of an object included in the first frame, which is displayed first, and location information of the bounding box pf the same object included in the second frame, which is displayed next. For example, the ADAS 900 may determine whether an event occurs, by analyzing the change in the location of each of the plurality of objects according to time.

According to some example embodiments, the ADAS 900 may determine a type of the event by analyzing the sequential change in the bounding boxes of the objects in the plurality of frames. According to some example embodiments, the ADAS 900 may determine a level of risk of driving by analyzing the sequential change in the bounding boxes of the objects in the plurality of frames. In some example embodiments, the ADAS 900 may determine a moving speed and a moving direction of an object in the plurality of frames based on a sequential change with respect to a bounding box indicating the object in the plurality of frames, and the ADAS 900 may determine a type of a driving event associated with the vehicle 100 and a level of risk of driving the vehicle 100 based on the determined moving speed and moving direction of the object.

In operation S500, the ADAS 900 may generate an output signal, which may include a notification message, a control signal, information that may be used to generate any of same, or any combination thereof, based on the determination of whether the driving event occurs at operation S400.

In some example embodiments, operation S500 may include outputting ("transmitting") an output signal that includes information associated with the detected object and causes one or more output interfaces 980 to provide (e.g., generate) a notification message. The output signal may include information associated with the driving event of the vehicle 100 based on the type of the driving event and the level of risk of driving the vehicle 100. The notification message may be provided as an audio, a video, and/or vibration to an occupant and/or driver of the vehicle 100.

In some example embodiments, operation S500 may include outputting a an output signal that includes a control signal, also referred to herein as a command, for one or more driving control elements 990 and/or information that causes one or more driving control elements 990 to generate one or more control signals that cause the one or more driving control elements 990 to control one or more aspects of driving the vehicle 100, including steering control, brake control, throttle control, any combination thereof, or the like, to control a driving trajectory of the vehicle 100. Accordingly, in some example embodiments, operation S500 may include controlling the driving trajectory of the vehicle 100, via one or more output signals transmitted to one or more driving control elements 990, based on the driving event, including based upon on the type of the driving event and the level of risk of driving the vehicle 100.

According to some example embodiments, the ADAS 900 may use a second trained model to determine whether an event occurs. When an output value related to an object that is output from the first trained model is input in the second trained model, whether an event occurs may be output.

According to some example embodiments, the operation of detecting the object, the operation of marking object with the bounding box, and the operation of determining whether an event occurs may be performed using a plurality of trained models.

Figure 24:
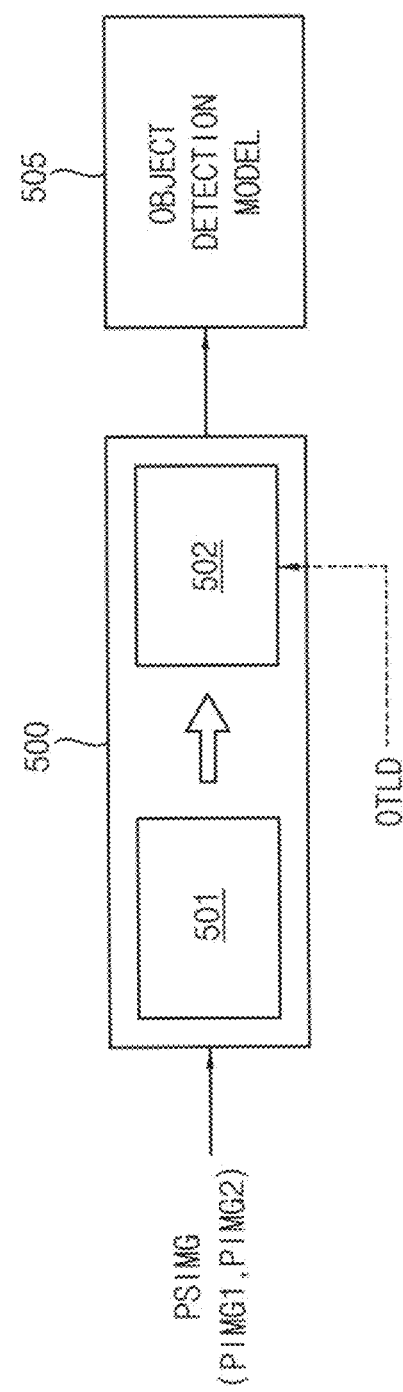
FIG. 24 is a diagram illustrating an operation of generating a trained model which determines whether a driving event of a vehicle occurs, according to some example embodiments.

FIG. 24 is a diagram illustrating an operation of generating a trained model which determines whether a driving event of a vehicle occurs, according to some example embodiments.

According to some example embodiments, event detection model (e.g., including processing circuitry and/or program elements) 505 which detects a driving event of a vehicle based on a location of an object may be generated by training a first trained model (e.g., including processing circuitry and/or program elements) 501 and a second trained model (e.g., including processing circuitry and/or program elements) 502 using at least one of the first pre-processed viewpoint image PIMG1 and the second pre-processed viewpoint image PIMG2 in the pre-processed stereo image PSIMG.

According to some example embodiments, the first trained model 501 may include various processing circuitry and/or program elements and be generated by learning a reference for determining a type of an object and a reference for determining a location of a bounding box of the object in each of a plurality of frames, using, for example, and without limitation, a fully convolutional network (FCN), or the like.

According to some example embodiments, the ADAS 900 may input to the first trained model 501 at least one of the first pre-processed viewpoint image PIMG1 and the second pre-processed viewpoint image PIMG2, which includes frames including RGB channels. The first trained model 501 may be trained to detect an object in at least one of the first pre-processed viewpoint image PIMG1 and the second pre-processed viewpoint image PIMG2 and to mark the detected object with a bounding box by using the object detection engine 400 of FIG. 6.

The ADAS 900 may detect an object in at least one of the first pre-processed viewpoint image PIMG1 and the second pre-processed viewpoint image PIMG2 and may mark the detected object with a bounding box by using the first trained model 501. The ADAS 900 may detect objects in one frame and determine a type of each of the objects using the first trained model 501.

The second trained model 502 may be generated by learning a reference for determining whether a driving event of a vehicle occurs by analyzing a sequential change in the bounding box in the plurality of frames, using, for example, and without limitation, at least one of various neural networks. The output of the first trained model 501 may be used as an input of the second trained model 502. According to some example embodiments, the ADAS 900 may use a matrix generated by reducing a dimension of the matrix output from the first trained model, as the input of the second trained model, in order to reduce the amount of operations of the second trained model 502 which determines whether an event occurs. For example, dilated convolution, or the like, may be used to reduce the dimension of the matrix.

The ADAS 900 may detect the object more accurately by using the first trained model 501 to which the radar reflected waves are input in addition to the pre-processed stereo image PSIMG. Thus, the ADAS 900 may determine occurrence of an event using the first trained model 501. According to some example embodiments, the second trained model 502 may generate an object detection model 505 by combining an output of the first trained model 501 and the object tracking list data OTLD.

According to some example embodiments, the processing circuit 1000a or 1000b may obtain a first trained model 501 based on a result of detecting a learning object from a video sequence including a plurality of learning frames captured while driving a learning vehicle, may detect the at least one object in the stereo image by using the obtained first trained model 501 and may mark the detected object with a bounding box.

Figure 25:
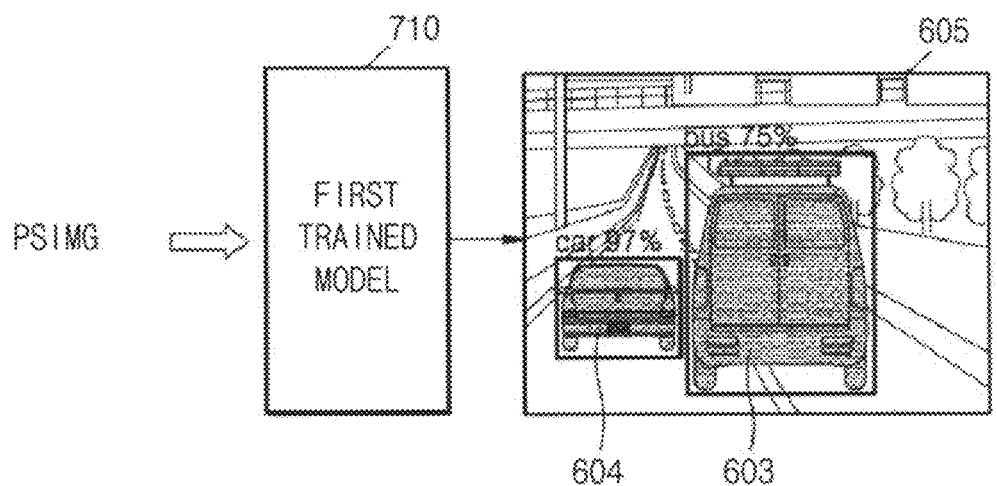
FIG. 25 is a diagram illustrating an example of detecting an object using a first trained model according to some example embodiments.

FIG. 25 is a diagram illustrating an example of detecting an object using a first trained model according to some example embodiments.

Referring to FIG. 25, the ADAS 900 may detect an object in a frame and may mark the detected object with a bounding box using a first trained model 710 learned using, as an input value, a pre-processed stereo image PSIMG including a plurality of frames obtained during driving of a vehicle.

As described herein, the ADAS 900 (e.g., ADAS 900a, 900b, etc.), in some example embodiments, may be configured to perform some operations by artificial intelligence and/or machine learning, including deep learning. As an example, the ADAS 900 may include a processing circuit (e.g., processing circuit 1000, 1000a, 1000b, etc.) that may include an artificial neural network that is trained on a set of training data (e.g., learning data, learning frames, etc.) by, for example, a supervised, unsupervised, and/or reinforcement learning model, and wherein the processing circuit may process a feature vector to provide output (e.g., a first trained model 501, a second trained model 502, etc.) based upon the training. Such artificial neural networks may utilize a variety of artificial neural network organizational and processing models, such as convolutional neural networks (CNN), deconvolutional neural networks, recurrent neural networks (RNN) optionally including long short-term memory (LSTM) units and/or gated recurrent units (GRU), stacked neural networks (SNN), state-space dynamic neural networks (SSDNN), deep belief networks (DBN), and/or restricted Boltzmann machines (RBM). Alternatively or additionally, the processing circuit may include other forms of artificial intelligence and/or machine learning, such as, for example, linear and/or logistic regression, statistical clustering, Bayesian classification, decision trees, dimensionality reduction such as principal component analysis, and expert systems; and/or combinations thereof, including ensembles such as random forests and generative adversarial networks (GANs).

According to some example embodiments, since the first trained model 710 may use FCN, the ADAS 900 may output a type of the object and the bounding box when the pre-processed stereo image PSIMG is input to the first trained model 710.

According to some example embodiments, when a series of matrices output from the first trained model 710 are generated into an image, a video sequence 605 in which objects included in the video sequence 605 are indicated in different colors based on types thereof may be obtained. For example, a road forming a constant pattern and a vehicle that is a moving object may be indicated in different colors.

According to some example embodiments, the ADAS 900 may detect a type of the object and a level of accuracy of object recognition. For example, the ADAS 900 may determine types and locations of a first object 603 and a second object 604 in the video sequence 605 output from the first trained model 710. The ADAS 900 may recognize with a level of accuracy of 75% that the first object 603 is a bus using information about a shape and a location of the first object 603, and recognize with a level of accuracy of 97% that the second object 604 is a car using information about a shape and a location of the second object 604.

Figure 26:
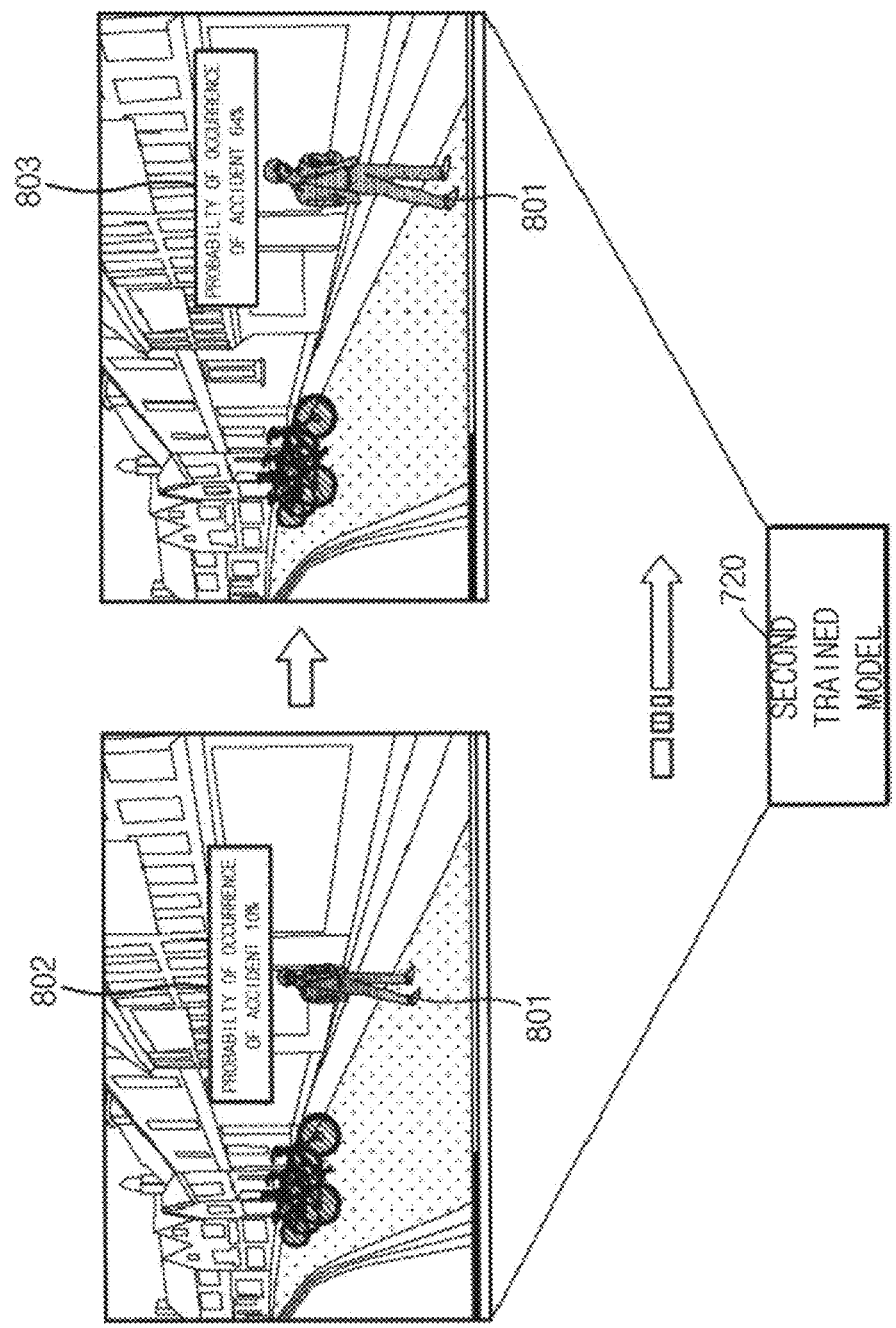
FIG. 26 is a diagram illustrating an example of determining whether an event occurs based on sequential movement of an object using a second trained model according to some example embodiments.

FIG. 26 is a diagram illustrating an example of determining whether an event occurs based on sequential movement of an object using a second trained model according to some example embodiments.

According to some example embodiments, when frames including the object including the location information, output from the first trained model 710, are input in the second trained model 720, it may be determined whether an event related to the object occurs.

According to some example embodiments, the second trained model 720 may use, for example, and without limitation, an recursive neural network (RNN), which may refer, for example, to a neural network in which nodes are recurrently connected to one another in different temporal sections. The RNN may recognize sequential data.

The RNN may be trained via supervised learning in which learning data and output data corresponding thereto are input in the neural network and connection weights of connecting lines are modified and refined so that the output data corresponding to the learning data is output. For example, the RNN may modify and refine the connection weights between neurons based on a delta rule and back propagation learning.

For example, the second trained model 720 may recognize a bounding box marking an object 801, which is located closer to the driving vehicle in the next frame than in the previous frame, and may determine that collision between an object 801 and the driving vehicle occurs.

According to some example embodiments, the second trained model 720 may predict a probability of occurrence of an event based on an object, by analyzing a sequential change in a bounding box of the object. For example, the second trained model 720 may determine a probability of occurrence of an accident based on a distance between the object 801 and a vehicle, the distance being determined based on the location of the object 801. According to some example embodiments, when the second trained model 720 determines that the distance between the object 801 and the vehicle is great, the second trained model 720 may determine that the probability of the occurrence of the accident is 10% as described in operation 802. When the second trained model 720 determines that the distance between the vehicle and the object 801 has decreased as the vehicle and the object 801 move according to time, the second trained model 720 may determine that the probability of the occurrence of the accident is 64% as described in operation 803. According to some example embodiments, the probability of the occurrence of the accident based on the movement of the vehicle and the object 801 according to time may be learned by the second trained model 820.

According to some example embodiments, the processing circuit 1000a or 1000b may obtain a second trained model based on a result of learning whether a driving event of a learning vehicle occurs based on a sequential change with respect to a bounding box indicating an object in a plurality of learning frames, and may determine whether the driving event of the vehicle with respect to the object occurs using the obtained second trained model.

Figure 27:
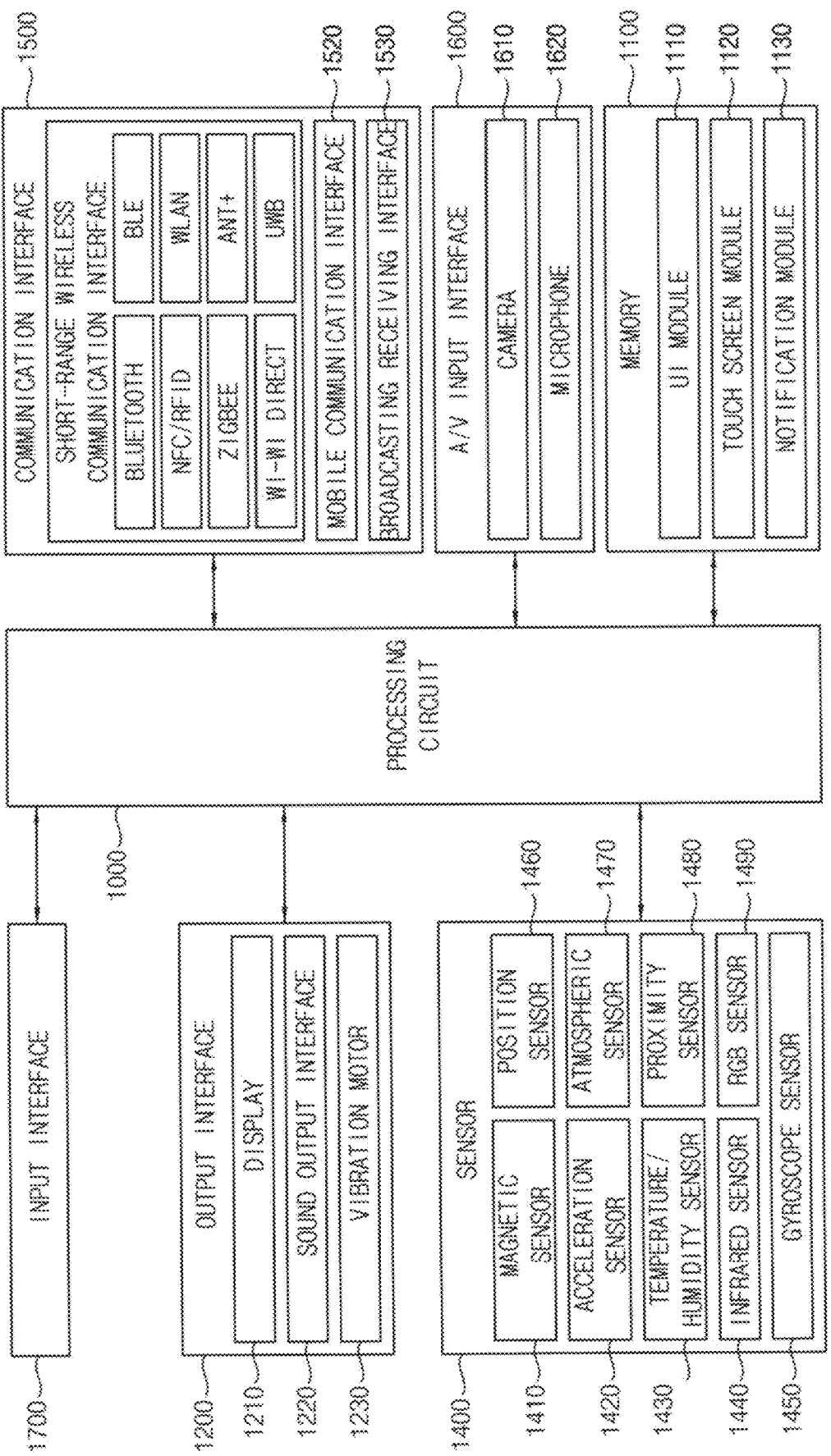
FIG. 27 is a block diagram illustrating an electronic device according to some example embodiments.

FIG. 27 is a block diagram illustrating an electronic device according to some example embodiments. Each of the elements shown in FIG. 27 may be at least partially included in the ADAS 900a shown in FIG. 2 and/or the ADAS 900b shown in FIG. 17.

Referring to FIG. 27, an electronic device 950 may include a processing circuit 1000, a communication interface (e.g., including communication circuitry) 1500, and a memory 1100. The electronic device 950 may further include an input interface (e.g., including input circuitry) 1700, an output interface (e.g., including output circuitry) 1200, a sensor 1400, and an audio/video (NV) input interface (e.g., including A/V input circuitry) 1700.

The input interface 1700 may receive an input for controlling an operation of a module mounted in a vehicle.

The output interface 1200 may include various circuitry to output an audio signal, a video signal, and/or a vibration signal, and may include a display 1210, a sound output interface (e.g., including sound output circuitry) 1220, and a vibration motor 1230. According to some example embodiments, the output interface 1200 may output a notification message as an audio, a video, and/or vibration. In some example embodiments, the output interface 1200 may be caused (e.g., by the processing circuit 1000) to output ("transmit") the notification message to include information associated with the driving event of the vehicle 100 based on the type of the driving even and the level of risk of driving the vehicle 100.

The display 1210 may display and output information processed in the processing circuit 1000. For example, the display 1210 may display a notification message on a head up display (HUD) of a vehicle. The sound output interface 1220 may include various circuitry to output audio data received from the communication interface 1500 or stored in the memory 1100. Also, the sound output interface 1220 may output a sound signal (for example, a call signal reception sound, a message reception sound, a notification sound) related to functions performed in the electronic device 950. For example, the sound output interface 1220 may output an alarm sound for notifying about occurrence of an event.

The processing circuit 1000 may include various processing circuitry and control general operations of the electronic device 950, in general. For example, the processing circuit 1000 may generally control the user input interface 1700, the output interface 1200, the sensor 1400, the communication interface 1500, the AN input interface 1600, or the like, by executing programs stored in the memory 1100. Also, the processing circuit 1000 may perform the functions of the electronic device 950, by executing the programs stored in the memory 1100. The processing circuit 1000 may include at least one processor. The processing circuit 1000 may include a plurality of processors or an integrated one processor, based on functions and operations thereof. According to some example embodiments, the processing circuit 1000 may include at least one processor configured to execute at least one program stored in the memory 1100 to provide a notification message. The processing circuit 1000 may obtain a video sequence including a plurality of frames from a camera mounted in a vehicle via the communication interface 1500. The processing circuit 1000 may transmit a command configured to control an operation of a module mounted in a vehicle (e.g., one or more driving control elements 990) to the module mounted in the vehicle (e.g., one or more driving control elements 990), based on a type of an event and a level of risk of driving the vehicle, via the communication interface 1500.

The sensor 1400 may include various sensors and sensing circuitry to sense a state of the electronic device 950, a state of a user, or a state around the electronic device 950, and may transmit sensed information to the processing circuit 1000.

The sensor 1400 may include various sensing circuitry, such as, for example, and without limitation, at least one of a magnetic sensor 1410, an acceleration sensor 1420, a temperature/humidity sensor 1430, an infrared sensor 1440, a gyroscope sensor 1450, a position sensor (for example, global positioning system (GPS)) 1460, an atmospheric sensor 1470, a proximity sensor 1480, and an RGB sensor 1490, but is not limited thereto.

The communication interface 1500 may include various communication circuitry including at least one component configured to enable the electronic device 950 to communicate with another electronic device (not shown) and a server (not shown). The other electronic device may be a computing device or a sensor, but is not limited thereto. For example, the communication interface 1500 may include a short-range wireless communication interface 1510, a mobile communication interface 1520, and a broadcasting receiving interface 1530.

The short-range wireless communication interface 1510 may include a Bluetooth communication interface, a Bluetooth low energy communication interface, a near-field communication interface (NFC/RFID), a WLAN (Wi-fi) communication interface, a Zigbee communication interface, an infrared data association (IrDA) communication interface (not shown), a Wi-fi direct (WFD) communication interface, a ultra wideband (UWB) communication interface, an Ant+ communication interface, or the like, but is not limited thereto.

According to some example embodiments, the communication interface 1500 may receive the video sequence including the plurality of frames from the camera mounted in the vehicle. The communication interface 1500 may transmit the command for controlling an operation of a module mounted in the vehicle to the module mounted in the vehicle.

The A/V input interface 1600 may include various A/V interface circuitry and is configured to input an audio signal or a video signal, and may include a camera 1610, a microphone 1620, or the like. The camera 1610 may obtain an image frame, such as a still image or a video, via an image sensor, in a videotelephony mode or a photographing mode. The image captured by the image sensor may be processed by the processing circuit 1000 or an additional image processor (not shown). For example, the image captured by the camera 1610 may be used as information for determining whether an event occurs.

The microphone 1620 may receive an external sound signal and process the external sound signal as electrical sound data. For example, the microphone 1620 may receive the sound signal from an external device or the user. The microphone 1620 may use various noise-removal algorithms to remove noise generated in a process of receiving the external sound signal.

The memory 1100 may store programs for the processing and controlling operations of the processing circuit 1000, and may store data that is input to the electronic device 950 or output from the electronic device 950.

The memory 1100 may include at least one type of storage medium from among a flash memory type, a hard disk type, a multimedia card micro type. The programs stored in the memory 1100 may be divided into a plurality of modules based on their functions. For example, the programs may be divided into a user interface (UI) module 1110, a touch screen module 1120, and a notification module 1130.

The UI module 1110 may provide a specialized UI, a graphic user interface (GUI), etc., which are synchronized to the electronic device 950, for each application. The touch screen module 1120 may sense a touch gesture on a touch screen via the user, and transmit information related to the touch gesture to the processing circuit 1000. The touch screen module 1120 according to some example embodiments may recognize and analyze a touch code. The touch screen module 1120 may be implemented as additional hardware including a controller.

The notification module 1130 may generate a signal to notify about occurrence of an event. The notification module 1130 may output the notification signal as a video signal via the display 1210, output the notification signal as an audio signal via the sound output interface 1220, or output the notification signal as a vibration signal via the vibration motor 1230.

The above-described various example embodiments are implemented by hardware components, software components or combinations of the hardware components and the software components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components.

Example embodiments may be employed in ADAS which detects an object based on artificial neural network.

The foregoing is illustrative of some example embodiments and is not to be construed as limiting thereof. Although some example embodiments have been described, those skilled in the art will readily appreciate that many modifications are possible in some example embodiments without materially departing from the novel teachings and advantages of the present disclosure. Accordingly, all such modifications are intended to be included within the scope of the present disclosure as defined in the claims.

What is claimed is:

1. An advanced driver assist system (ADAS), comprising:
a processing circuit; and
a memory which stores instructions executable by the processing circuit,
wherein the processing circuit is configured to execute the instructions to cause the ADAS to
obtain, from a vehicle, a video sequence including a plurality of frames captured at the vehicle, each frame of the plurality of frames corresponding to a separate stereo image including a first viewpoint image and a second viewpoint image;
generate disparity information associated with a stereo image of a frame of the plurality of frames based on a difference between pixel values of corresponding pixels of the first viewpoint image and the second viewpoint image;
obtain depth information associated with at least one object included in the stereo image based on reflected electromagnetic waves captured at the vehicle;
calculate correlation information between the depth information and the disparity information based on the stereo image, the depth information and the disparity information;
correct depth values associated with the stereo image based on the disparity information and the correlation information to generate a depth image of the stereo image; and
generate an output signal based on the depth image to cause one or more driving control elements of the vehicle to at least partially control driving of the vehicle along a driving trajectory.

2. The ADAS of claim 1, wherein the processing circuit is configured to generate the disparity information based on performing stereo matching on the corresponding pixels of the first viewpoint image and the second viewpoint image.

3. The ADAS of claim 1, wherein the processing circuit is configured to
generate an object tracking list including distance information associated with the at least one object based on the reflected electromagnetic waves captured at the vehicle;
extract at least one mask based on separating the at least one object from at least one of the first viewpoint image and the second viewpoint image;
perform a matching operation on the at least one mask and the object tracking list; and
generate the correlation information based on a result of the matching operation and the disparity information.

4. The ADAS of claim 3, wherein the processing circuit is configured to generate a matching result on the mask that distinguishes the at least one object.

5. The ADAS of claim 4, wherein the processing circuit is configured to generate the matching result on the mask that distinguishes the at least one object based on the distance information associated with the at least one object based on performing the matching operation on the at least one mask and the object tracking list.

6. The ADAS of claim 1, wherein each separate pixel of the depth image is associated with a separate depth value.

7. The ADAS of claim 1, wherein the processing circuit is configured to detect the at least one object in the depth image.

8. The ADAS of claim 7, wherein the processing circuit is further configured to execute the instructions to cause the ADAS to
obtain a first trained model based on a result of detecting a learning object from a learning video sequence including a plurality of learning frames captured while driving a learning vehicle; and
detect the at least one object in the stereo image based on inputting the stereo image to the obtained first trained model.

9. The ADAS of claim 1, wherein the processing circuit is further configured to execute the instructions to cause the ADAS to
determine a moving speed and a moving direction of the object based on a sequential change with respect to a bounding box indicating an object in the plurality of frames;
determine a type of a driving event associated with the vehicle and a level of risk of driving the vehicle based on the moving speed and the moving direction of the at least one object.

10. The ADAS of claim 1, wherein the processing circuit is further configured to execute the instructions to cause the ADAS to
obtain a second trained model based on a result of learning whether a driving event of a learning vehicle occurs based on a sequential change with respect to a bounding box indicating an object in a plurality of learning frames; and
determine whether the driving event of the vehicle with respect to the object occurs using the obtained second trained model.

11. The ADAS of claim 1, wherein the processing circuit is configured to implement
an image pre-processor configured to pre-process the stereo image to output a pre-processed stereo image including a first pre-processed viewpoint image and a second pre-processed viewpoint image;
a disparity estimation engine configured to generate a disparity image including the disparity information based on the first pre-processed viewpoint image and the second pre-processed viewpoint image;
an object tracking engine configured to provide an object tracking list data including distance information with respect to the at least one object based on the captured reflected electromagnetic waves;
a correlation calculation module configured to calculate the correlation information based on the object tracking list data and the disparity information;
a depth image generation engine configured to correct depth values of the disparity image based on the correlation information to generate the depth image; and
an object detection engine configured to detect the at least one object in the pre-processed stereo image to output a final image including the detected at least one object or to output a bounding box indicating the detected at least one object.

12. The ADAS of claim 11, wherein the correlation calculation module includes
a scene segmentation engine configured to segment the at least one object from at least one of the first pre-processed viewpoint image and the second pre-processed viewpoint image to extract at least one mask;

a matching engine configured to perform a matching operation on the at least one mask and the object tracking list data to output matching results; and a correlation calculation engine configured to calculate the correlation information based on the matching results and the disparity information.

13. The ADAS of claim 11, wherein the object detection engine includes a first feature extractor configured to extract features of at least one of the first pre-processed viewpoint image and the second pre-processed viewpoint image to provide a first feature vector;

a second feature extractor configured to extract features of the depth image to provide a second feature vector;

a sensor fusing engine configured to fuse the first feature vector and the second feature vector to provide a fused feature vector; and a box predictor configured to output the final image including the detected at least one object or to output the bounding box indicating the detected at least one object.

14. The ADAS of claim 13, wherein the box predictor is configured to:

mark the at least one object in the final image in three-dimensions with the bounding box to output the marked at least one object; or convert the final image in three-dimensions to a bird-eye view image in two-dimension, and mark the at least one object in the bird-eye view image with the bounding box to output the marked at least one object.

15. The ADAS of claim 11, wherein the pre-processed stereo image has a first frames per second (FPS);

the object tracking list data has a second FPS different from the first FPS;

the processing circuit is configured to synchronize the pre-processed stereo image and the object tracking list data by using a synchronization signal;

the correlation calculation module is updated slower than the image pre-processor, the disparity estimation engine and the depth image generation engine.

16. An advanced driver assist system (ADAS), comprising:

a processing circuit; and a memory which stores instructions executable by the processing circuit, wherein the processing circuit is configured to execute the instructions to cause the ADAS to obtain, from a vehicle, a video sequence including a plurality of frames captured at the vehicle, each frame of the plurality of frames corresponding to a separate stereo image including a first viewpoint image and a second viewpoint image;

generate disparity information associated with a stereo image of a frame of the plurality of frames based on a difference between pixel values of corresponding pixels of the first viewpoint image and the second viewpoint image;

obtain depth information associated with at least one object included in the stereo image based on reflected electromagnetic waves captured at the vehicle;

obtain point cloud information associated with the at least one object included in the stereo image based on reflected light captured at the vehicle;

calculate correlation information between the depth information and the disparity information based on the stereo image, the depth information, the point cloud information and the disparity information; and correct depth values of the stereo image based on the disparity information and the correlation information to generate a depth image of the stereo image; and generate an output signal based on the depth image to cause one or more driving control elements of the vehicle to at least partially control driving of the vehicle along a driving trajectory.

17. The ADAS of claim 16, wherein the processing circuit is further configured to execute the instructions to cause the ADAS to generate an object tracking list including distance information associated with the at least one object based on the reflected electromagnetic waves captured at the vehicle;

calculate spatial depth information based on the point cloud information;

extract at least one mask based on separating the at least one object from at least one of the first viewpoint image and the second viewpoint image;

perform a matching operation on the at least one mask, the object tracking list and spatial depth information; and generate the correlation information based on a result of the matching operation and the disparity information.

18. A method of detecting an object in an advanced driver assist system (ADAS), the method comprising:

obtaining, from a vehicle, a video sequence including a plurality of frames captured at the vehicle, each frame of the plurality of frames corresponding to a separate stereo image including a first viewpoint image and a second viewpoint image;

calculating disparity information associated with a stereo image of a frame of the plurality of frames based on a difference between pixel values of corresponding pixels of the first viewpoint image and the second viewpoint image;

obtaining depth information associated with at least one object included in the stereo image based on reflected electromagnetic waves captured at the vehicle;

calculating correlation information between the depth information and the disparity information based on the stereo image, the depth information and the disparity information;

correcting depth values associated with the stereo image based on the correlation information to generate a depth image of the stereo image; and generating an output signal based on the depth image to cause one or more driving control elements of the vehicle to at least partially control driving of the vehicle along a driving trajectory.

* * * * *